(12) United States Patent
Kawasaki

(10) Patent No.: US 6,675,068 B1
(45) Date of Patent: Jan. 6, 2004

(54) WORKING ROBOT

(75) Inventor: Shuichi Kawasaki, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/763,456

(22) PCT Filed: Mar. 8, 2000

(86) PCT No.: PCT/JP00/01394

§ 371 (c)(1),
(2), (4) Date: Jul. 17, 2001

(87) PCT Pub. No.: WO00/53377

PCT Pub. Date: Sep. 14, 2000

(30) Foreign Application Priority Data

Mar. 10, 1999 (JP) .............................. 11-063451
Aug. 25, 1999 (JP) .............................. 11-238301
Oct. 29, 1999 (JP) .............................. 11-308439

(51) Int. Cl.[7] .............................. G06F 19/00
(52) U.S. Cl. .............. 700/245; 700/248; 700/249; 700/254; 700/257; 700/262; 901/15; 901/21; 901/28; 901/50; 701/23; 414/680; 451/57; 244/159
(58) Field of Search .............................. 700/254, 245, 700/257, 262, 248, 249; 244/159, 161, 172, 173; 451/57, 159, 160, 58, 67, 287, 332, 333; 414/680, 744.5; 901/15, 21, 28, 50; 701/23; 929/564.2

(56) References Cited

U.S. PATENT DOCUMENTS 3,266,059 A * 8/1966 Stelle .......................... 623/62
3,773,087 A * 11/1973 Katayama .................. 138/120

(List continued on next page.)

FOREIGN PATENT DOCUMENTS

| JP | 58-209667 | 12/1983 |
| JP | 62-101712 | 5/1987 |
| JP | 62-131886 | 6/1987 |
| JP | 2-212906 | 8/1990 |
| JP | 5-92779 | 4/1993 |
| JP | 6-285775 | 10/1994 |
| JP | 8-192379 | 7/1996 |

OTHER PUBLICATIONS

Hwang et al., Design of a SPDM–like robotic manipulator system for space station on orbit replaceable unit ground testing and overview of the system architecture, 1994, Internet/IEEE, pp. 1286–1291.*

Bronez et al., Rquirements development for a free–flying robot—The "ROBIN", 1986, IEEE, pp. 667–672.*

Lymer et al., Special Purpose Dexterous Manipulator, 2000, Internet, pp. 1–2.*

(List continued on next page.)

Primary Examiner—William A. Cuchlinski, Jr.
Assistant Examiner—McDieunel Marc
(74) Attorney, Agent, or Firm—Wenderoth, Lind & Ponack, L.L.P.

(57) ABSTRACT

A working robot is used in space for inspecting the state of a structure of a house module in space or for replacing M/D shields. A robot body is provided with four multifunctional arms (or two moving arms and two multifunctional arms), which are equipped with manipulation tools at their leading ends. The robot is moved by the manipulation tools of each of the multifunctional arms gripping a working socket or the head of a bolt of an M/D shield and by the arms extending/contracting themselves. The M/D shield is fixed and lifted by the multifunctional arms 10 by inserting the manipulation tool into a T-handle socket. The bolts are removed by the manipulation tool of the multifunctional arms.

33 Claims, 30 Drawing Sheets

U.S. PATENT DOCUMENTS

| | | | | |
|---|---|---|---|---|
| 3,888,362 | A | * | 6/1975 | Fletcher et al. ............. 414/620 |
| 4,910,859 | A | * | 3/1990 | Holcomb ................... 29/564.2 |
| 4,969,795 | A | * | 11/1990 | Toyoda et al. ........... 414/744.2 |
| 5,267,605 | A | * | 12/1993 | Doty et al. .................. 165/41 |
| 5,407,152 | A | * | 4/1995 | Pelischek et al. ........... 244/159 |
| 5,441,221 | A | * | 8/1995 | Wade et al. ................ 244/159 |
| 5,445,247 | A | * | 8/1995 | Sato .......................... 188/266 |
| 5,513,946 | A | * | 5/1996 | Sawada et al. .......... 414/744.5 |
| 6,358,128 | B1 | * | 3/2002 | Sakurai et al. ............... 451/67 |
| 2002/0045410 | A1 | * | 4/2002 | Sakurai et al. ................ 451/57 |

OTHER PUBLICATIONS

EMS Technologies, Mobile Servicing System facts and figures, 1999, Internet, pp. 1–16.*

Ata et al., Effects of tip mass adn actuator inertia on teh behavior of a flexible arm robot, 1998, IEEE, pp. 502–507.*

* cited by examiner

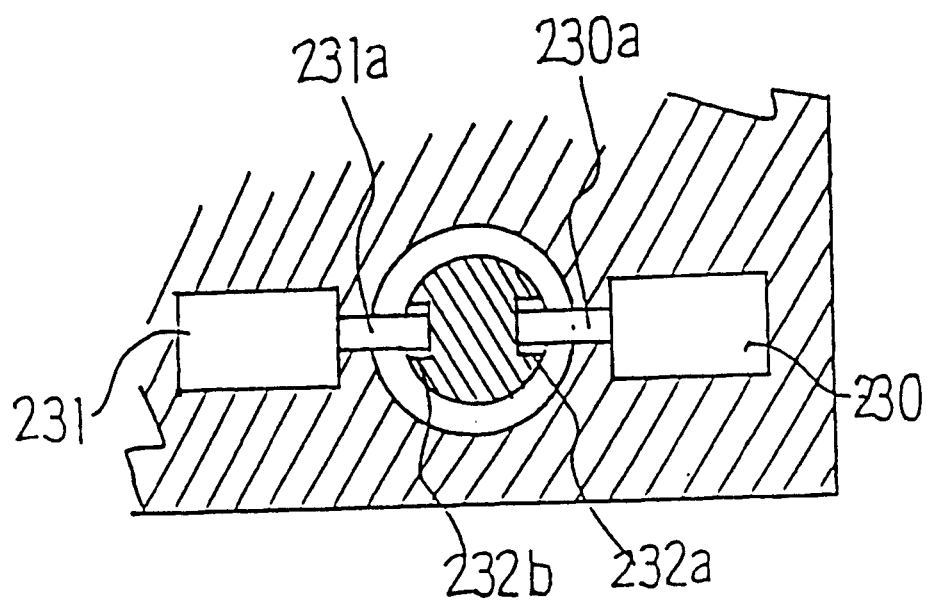
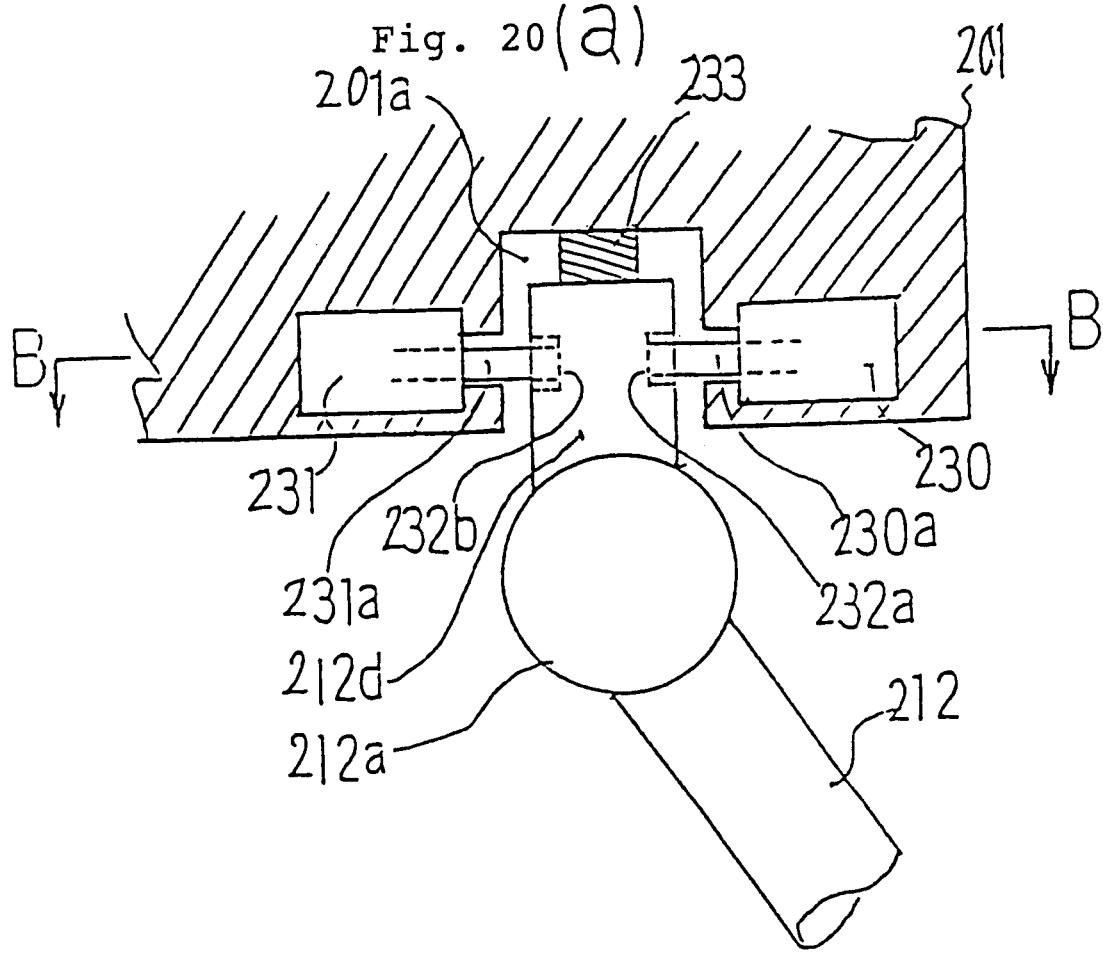

Fig. 23
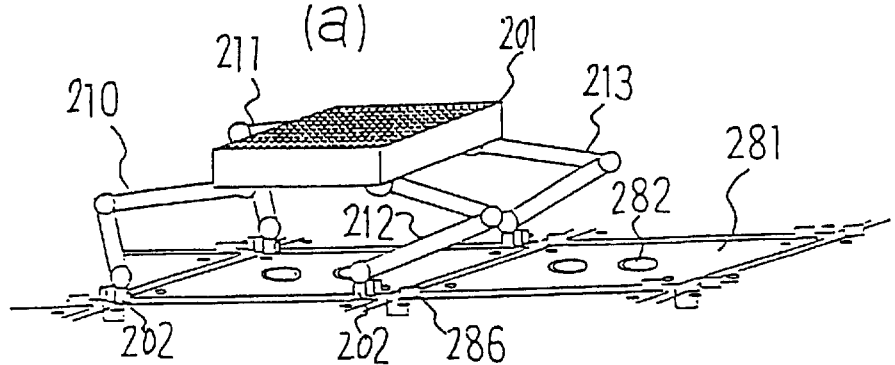
(a)
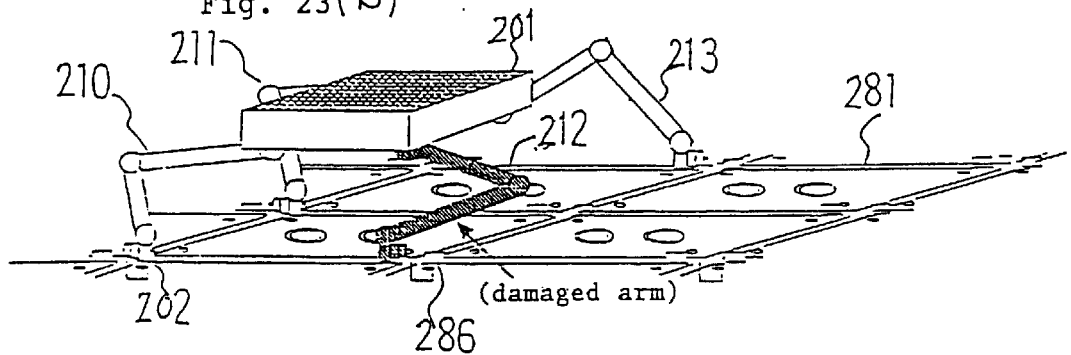
Fig. 23(b)
(damaged arm)
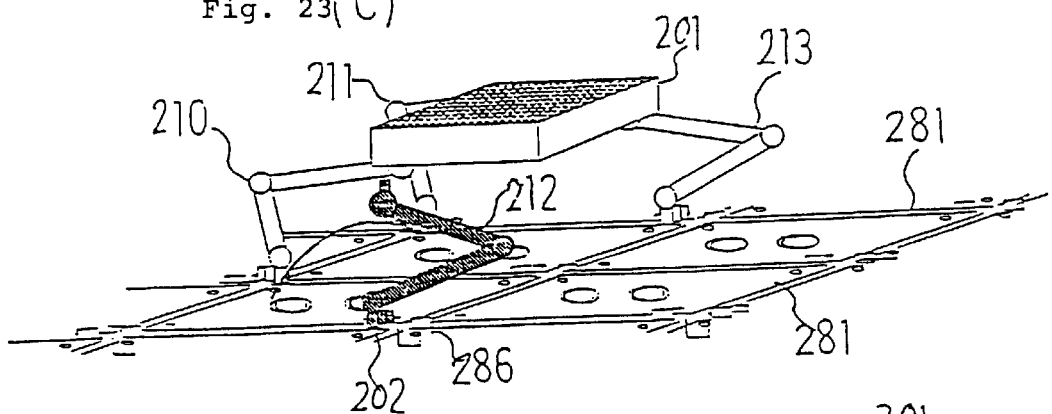
Fig. 23(C)
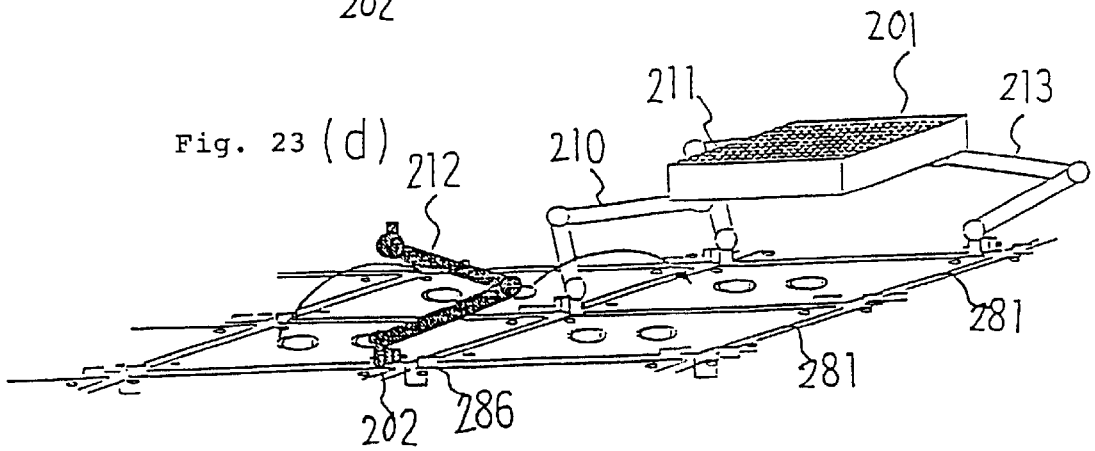
Fig. 23(d)

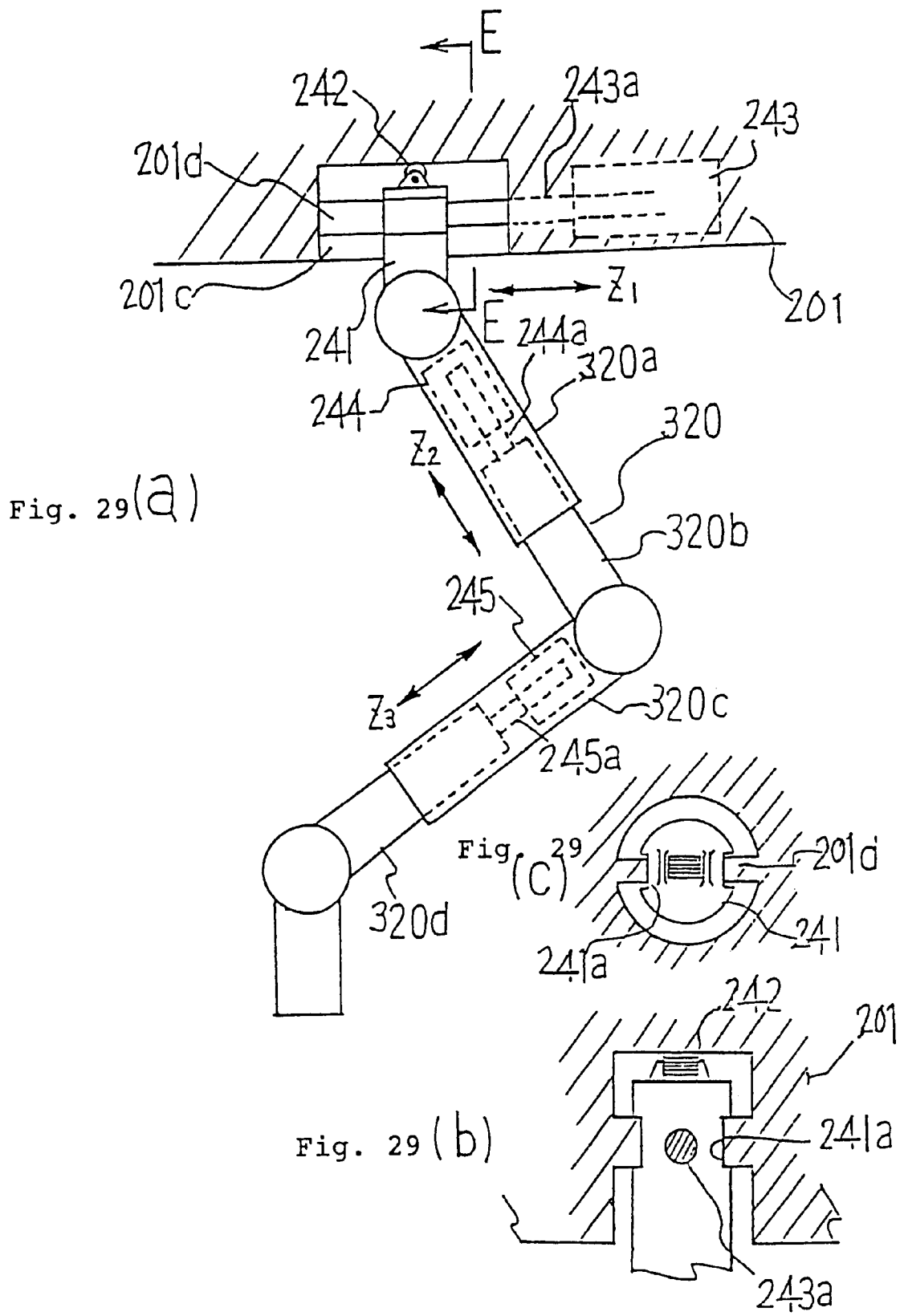

WORKING ROBOT

TECHNICAL FIELD

The present invention relates to a working robot for working in space to inspect a structure in a space station or an artificial satellite or to replace an attached member (e.g., an orbital replacement unit (ORU), various functional parts, a shield, orbital structure parts, or pay-loads, as will be generally called the "attached member", of which the "shield" will be adopted and described as one example of the attached member for convenience of description in the following individual portions) attached to the surface of the structure, for astronauts so that the movement of the attached member and the replacement of the structure can be precisely performed to improve the working safety in space. Moreover, the invention enables the robot body to move while being fixed on the ground or cliff in an environment of rough ground on a star or the earth.

BACKGROUND ART

FIG. 34 is a diagram showing one example of a manned module constructing a portion of the space station. In FIG. 34, numeral 80 designates a module body having an experimental house space therein. To the periphery of the module body 80, there are adhered protection panels called the "M/D (Meteoroid/Debris) shields" due to numerous fine obstacles such as paint chips flying in the universe of gravity-free space which can damage the surface of the module body if they hit it at a high speed. Numeral 81 designates the M/D shield which is equipped with two T-handle sockets 82 at two portions and with bolt holes 83 at its four corners and which is attached to the surface of the module body 80 by bolts 85. These M/D shields 81 cover the entire surface of the module body 80 to protect the inside against collisions with space obstacles.

Each T-handle socket 82 is equipped with jig inserting sockets so that a worker having space wear (a space unit) grips a T-shaped manipulation tool and inserts the leading end of the tool into the socket 82 to remove and replace the M/D shield 81. Numeral 84 designates a hand rail which is disposed at each portion on the outside circumference of the module body 80 so that the worker may perform the maintenance and inspection by gripping the hand rail 84 to move along the hand rail 84.

SUMMARY OF THE INVENTION

The work in space such as in the module or in the artificial satellite, as planned at the present stage, is mainly done by the worker having the space wear, and mechanization substituting for man power is desired for safety purposes. As for robots in space, on the other hand, there have been proposed a variety of robots which are composed of a single arm or two arms, but many of them have unsolved practical problems. Currently, no robot has been realized for inspecting the module body of the space station or for replacing the structure.

Therefore, the invention has been conceived to provide a working robot which can reliably move over the surface of the module structure in the space and can unbolt the target structure to replace it with a new one and mount the new structure, and a working robot which can reliably fix its body and can move easily and precisely for observations even on the ground of the satellite or the like.

In order to solve the above-specified problems, the invention provides the following.

A working robot includes a robot body and at least one arm device including a plurality of arm members articulately jointed at their end portions. The arm device is turnably attached at its one end to the robot body and has a manipulation tool connected to its other end and the arm device is further constructed in an extensible/contractible form. The arm device of the working robot can include at least one moving arm and one multifunctional arm. The moving arm moves the robot body by the manipulation tool by either gripping a head of a bolt for attaching an attached member, as attached to a surface of a structure, or removing the bolt and screwing another bolt, and the moving arm extending/contracting itself.

The working robot can also be designed such that the robot body and the multifunctional arm are enabled to lift the attached member by the robot body fixing a fixing member onto the attached member on the lower face of the robot body and by the multifunctional arm fixing the manipulation tool onto the attached member to be replaced. The robot body and the multifunctional arm are equipped with piston type adapters as the fixing member and the manipulation tool and the structure is equipped with sockets to engage with the adapters. Further, the arm device includes a plurality of multifunctional arms and the multifunctional arms move the robot body by the manipulation tools gripping sockets or bolt heads protruding from a surface of a structure and by the multifunctional arms extending/contracting themselves to change the grips to other sockets or bolt heads.

The working robot can also be designed such that the attached member to be replaced is enabled to be lifted by one of the multifunctional arms fixing the manipulation tool onto the attached member to be replaced, as attached to the surface of the structure, and by the manipulation tools of the remaining multifunctional arms gripping the sockets or bolt heads of an attached member other than the attached member to be replaced. The multifunctional arms are equipped at their manipulation tools with piston type adapters and the structure is equipped with sockets to engage with the adapters. The multifunctional arms can also be equipped at their manipulation tools with unbolting drivers for the bolts of the attached member. The multifunctional arms can further be equipped at their manipulation tools with hands for gripping hand rails attached to the structure.

The working robot can also be designed such that the arm device includes at least one moving arm and multifunctional arm. A lower face of the robot body and the manipulation tool of the moving arm are equipped with drills or bits to be inserted and fixed in the ground and the moving arm is enabled to move the robot body, while the robot body is unfixed to the ground, by the moving arm extending/contracting itself and screwing the drills or bits into the ground, then to fix the robot body on the ground by the drills or bits, and to remove the drills or bits of the moving arm from the ground after the robot body is fixed. The moving arm can also be equipped at its manipulation tool with a wheel adapter in place of the drills or bits so that it can move by the wheel. The moving arm can further be equipped at its manipulation tool with a light and a camera.

The working robot can also be designed such that the arm device includes a plurality of multifunctional arms. The multifunctional arms are equipped at their manipulation tools with drills or bits to be inserted and fixed in the ground and the multifunctional arms are enabled to move the robot body, while the robot body is unfixed to the ground, by the multifunctional arms extending/contracting themselves and screwing the drills or bits into the ground, then to fix the robot body on the ground by the drills or bits, and to remove the drills or bits of the multifunctional arms from the ground after the robot body is fixed. The multifunctional arms can also be equipped at their manipulation tools with wheel adapters in place of the drills or bits so that they can move by the wheels. The manipulation tools can further be equipped in their leading ends with lights and cameras. In addition, the multifunctional arm is equipped with a light and a camera for detecting a position of the multifunctional arm and a state of the ground.

The working robot can also be designed such that the arm device moves the robot body by the manipulation tool gripping sockets or bolt heads protruding from a surface of a structure and by the arm device extending/contracting itself to change the grips to other sockets or bolt heads. Further the arm device is enabled to grip, carry and transfer an attached member, as attached to the surface of the structure, by its manipulation tool. An attaching portion of each arm device to the robot body is so connected that the arm device can be removed during operation. Further, a plurality of visual sensors are attached to a surface of the robot body. In addition, an adapter is attached to a leading end of each arm device for gripping the sockets or bolt heads protruding from the surface of the structure and the adapter can be removed during operation from the leading end of the arm device.

The working robot can also be designed such that a supported member of an arbitrary shape can be mounted on an upper face of the robot body and there is disposed on the upper face of the robot body a support device which is movable according to a widthwise contour of the supported member to support the supported member by pushing and fixing on two sides thereof. Further, a supported member of an arbitrary shape can be mounted on an upper face of the robot body and the supported member is supported on its bottom face on the upper face of the robot body by an adapter.

Also, each arm device can be freely extended/contracted at its individual joints and an attaching portion of the arm device on the robot body can be extended by a predetermined length to adjust a position thereof and each the arm device is equipped between its joints with an extensible mechanism for changing a moving range, a gripping range and a moving speed.

Solar cell modules can also be attached to a surface of the robot body and to a periphery of each arm device so that individual portions of the robot body, even when they are separated from the robot body, can be driven by their own communications. Also, an antenna can be mounted on an upper face of the robot body. Further, the robot body can be made as a structure to be folded in two by turning at a center thereof.

The working robot includes the robot body and the extensible arm device turnably attached at its one end to the robot body and having the manipulation tool connected to its other end. The arm device is composed of the plurality of arm members connected articulately movably at their end portions so that the robot body can be properly moved by the coactions among the extensible device by the articulately movable joint structure or the like, the turning structure of the robot body and the manipulation tools so that the working robot can be applied to various operations by selecting the manipulation tools.

The robot body works around the structure such as the manned module in space. However, the structure has various attached members attached to its surface and is covered with the M/D shields for preventing the structure from being damaged by the collisions with the obstacles flying from the space. The moving arms are enabled to support the robot body by gripping the heads of the M/D shield attaching bolts by the manipulation tools or by screwing either the bolts carried by the manipulation tools or the bolts of the moving arms into the holes of the bolts previously removed, and are enabled to move the body reliably by gripping or screwing the M/D shield attaching bolts while extending/contracting one or more of the moving arms to move the moving arm or arms sequentially.

On the other hand, the manipulation tools of the moving arms are equipped with the drills or bits so that the body can be moved over the ground by inserting and fixing the drills or bits into the ground by the manipulation tools of the moving arms and by extending/contracting at least one moving arm. When the robot body is to be fixed over the ground, on the other hand, the body is reliably fixed by fixing the drills or bits of the body in the underlying ground. In the moving case, the body is moved by ungripping the bolts of the individual moving arms alternately. Further, the robot body can be moved with the wheels by replacing the drills or bits of the manipulation tools with the wheel adapters.

The module can be lifted by the multifunctional arms while the fixing members are fixing the body on the structure. On the other hand, the manipulation tools and the structure, or the module, can be reliably fixed by equipping the fixing members and the manipulation tools with the piston type adapters and by bringing the adapters into engagement with the socket portions on the structure side. Therefore, the module can be easily lifted and moved for its replacement.

The manipulation tools of the multifunctional arms can be equipped with the unbolting drivers so that the bolts of the attached member such as the module can be removed or mounted by manipulating the drivers. Therefore, the bolts of the attached member such as the shield are removed, at first by the manipulation tool of the multifunctional arm, and the attached member can then be lifted, removed, held and moved.

The structure such as the hand rail, as attached to the house module surface in space, can be gripped by the multifunctional arm so that the multifunctional arm can be widened in its action range in addition to the movement by the gripping of the bolt heads. Moreover, each of the individual manipulation tools of the multifunctional arms and the moving arms is equipped with the light and the camera so that the image or the detected data from the camera are retrieved by the control chamber or the like. The situations around the structure in the space can be confirmed or observed. On the other hand, the situations of the ground (surface) of a satellite can also be confirmed or observed.

The robot body works around the structure such as the manned module in space, and the structure is covered with the M/D shields so that it may be prevented from being damaged by the collisions with obstacles flying from space. The robot body can be supported either by gripping the working sockets protruding from the structure surface or by gripping the heads of the bolts, or by screwing the screws of the arms into the holes, from which the bolts have been removed, by the manipulation tools of the multifunctional arms, and the body can be reliably moved by moving the gripping position sequentially while extending/contracting the plurality of arms.

On the other hand, the drills or bits are mounted on the manipulation tools of the multifunctional arms so that the body can be moved over the ground by inserting and fixing the drills or bits into the ground to fix the manipulation tools of the multifunctional arms and by extending/contracting the plurality of arms. In the moving case, the individual arms are sequentially operated to perform the actions of removing the drills of the individual arms alternately and extending the arms to insert the drills into the ground ahead. The robot body can also be moved with the wheels by replacing the drills or bits of the manipulation tools by the wheel adapters.

With the body being fixed over the structure by the multifunctional arms, the module can be lifted by the manipulation tools. On the other hand, the manipulation tools and the structure, or the module, can be reliably fixed by bringing the piston type adapters of the manipulation tools into engagement with the socket portions on the structure side. Therefore, the module can be easily lifted and moved for its replacement.

On the other hand, the manipulation tools of the multifunctional arms are equipped with the unbolting drivers. Therefore, the module attaching bolts can be removed and mounted by manipulating the drivers. Therefore, the multifunctional arms are enabled to move the shield by removing the bolts from the shield, to lift and remove the shield and to hold and move the shield by their manipulation tools.

The structure such as the hand rail, as attached to the house module surface in space, can be gripped by the multifunctional arms, so that the multifunctional arms can be widened in their action range in addition to the movement by the gripping of the bolt heads. Moreover, the manipulation tools of the multifunctional arms are equipped on their circumferences and in their insides with lights and cameras so that the images or detection data can be retrieved from the cameras by the control chamber or the like. Therefore, the situations around the structure can be confirmed or observed. On the other hand, the state of the ground (surface) of the satellite can be confirmed or observed.

The robot body can work around the structure, e.g., the manned module in space. The structure is covered with M/D shields so that it may be prevented from being damaged by the collisions with obstacles flying from space. The robot body can be supported either by gripping the working sockets protruding from the structure surface or by gripping the heads of the bolts, or by screwing the screws of the arms into the holes, from which the bolts have been removed, by the manipulation tools of the arm device, and the body can be reliably moved by moving the gripping position sequentially while extending/contracting the plurality of arms. By using a necessary number of arm devices, on the other hand, their manipulation tools can be manipulated to lift and transport the MID shields of the attached members attached to the structure surface, thereby to replace the M/D shield. Moreover, the necessary arm device can be manipulated to mount an object on the upper face of the body.

Further, when any arm device of the robot is troubled so that the manipulation tool cannot be controlled or removed from the bolts or the like, the attached portion of the troubled arm device on the body is separated so that the body can be moved from the remaining arm devices while leaving the troubled one as it is, to retain safety.

The body is equipped with the visual sensors so that it can detect an obstacle or the like, if any, while confirming the surrounding environment. At the moving time, on the other hand, the body can be manipulated while its own position is precisely recognized, so that the works can be precisely done in space.

The adapters can also be attached to the leading ends of the arm devices. If the portion of the adapter gripping the structure is troubled so that the adapter cannot be removed from the bolt or the like gripped thereby, the adapter is separated from the leading end of the arm device, and the body can be removed while leaving the adapter as it is, so that the safety is retained.

An object such as the supported member can be mounted, and the support device moves to hold the object, even if the object has different sizes, on the two sides. On the other hand, the adapter can be used so that the support tool for the worker to work outside of the space vehicle can mount boxes of various shapes such as the tool holding devices to be attached to the manipulation tool or the experimental boxes by using the arms and can fix them by the support devices.

The arm of the working robot is extensible and can be adjusted in its attaching position on the body. According to the surrounding environments such as the width of the structure or the size of the moving position, the arm can be extended/contracted, and the attaching interval of the arms on the body can also be adjusted to move and control the working robot in an optimum state. Further, the solar cell modules can be attached to the body and the arm device so that the individual portions can generate electric power and can communicate independently of one another even if they are separate. On the other hand, the robot can be equipped thereon with the antenna so that its body can be an antenna station to track the transmission/reception directions of electric waves and to provide data communications between the space station and the ground of the earth or the like.

Also, the body can be folded in two or more portions and the portions can be laid one on the other so that it can be made compact in its entirety. When the body is to be transferred through the narrow passage of the space station, it can be compactly moved through the narrow place.

DESCRIPTION OF THE DRAWINGS

FIGS. 20(a) and (b) show an attached portion of the multifunctional arm of the robot shown in FIG. 18, and (a) is a sectional view, and (b) is a sectional view B—B.

FIGS. 23(a)–(d) show the movement of the working robot according to the ninth embodiment of the invention, and (a), (b), (c) and (d) show the moving steps individually.

FIGS. 29(a)–(c) shows a working robot according to a thirteenth embodiment of the invention, and (a) is a side elevation of a multifunctional arm, (b) is a view taken in the direction of arrows E—E of (a), and (c) a top plan view.

BEST MODE FOR CARRYING OUT THE INVENTION

Figure 1:
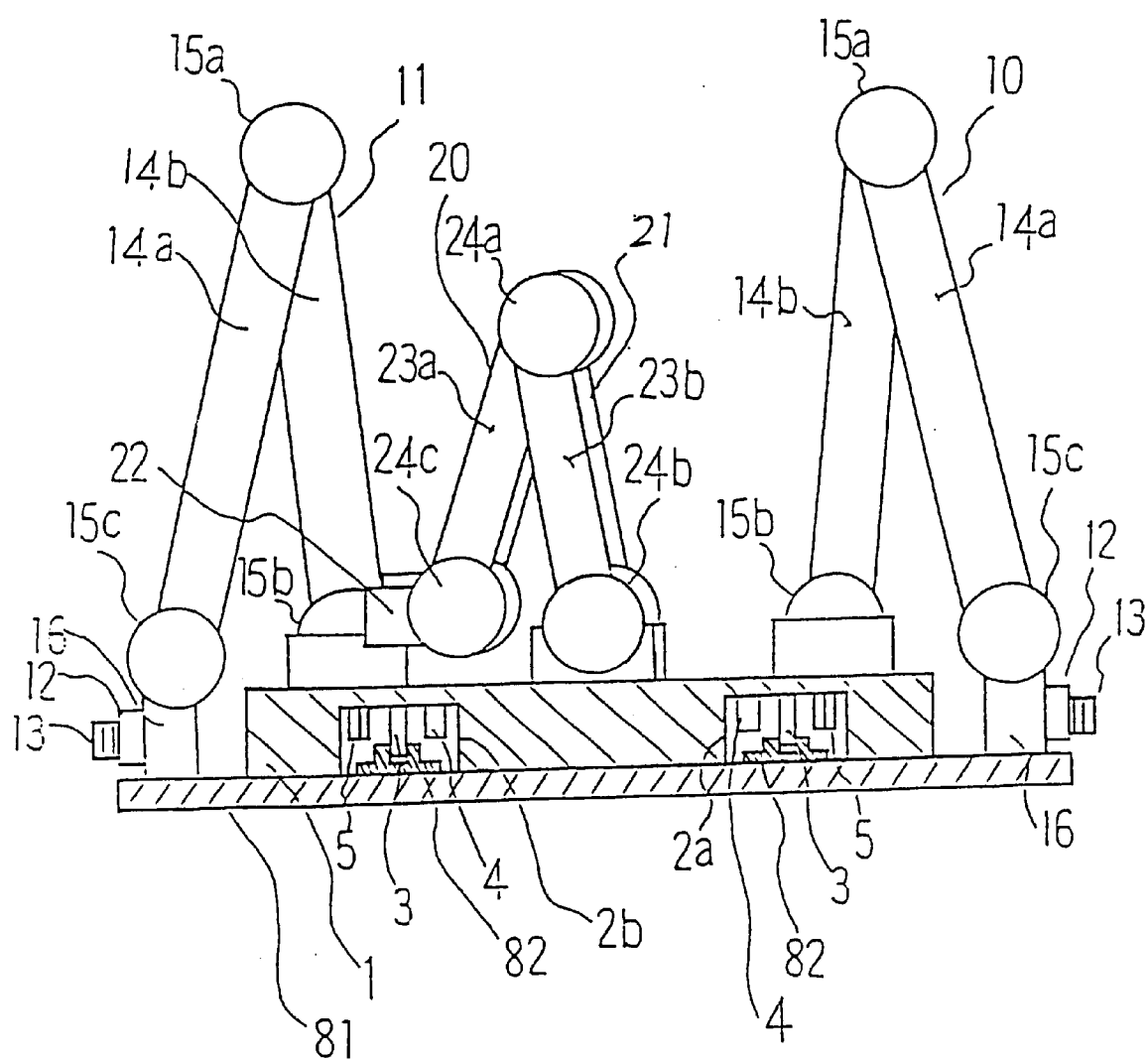
FIG. 1 is a construction diagram of a working robot according to a first embodiment of the invention.

The invention will be specifically described on its modes of embodiment with reference to the accompanying drawings. FIG. 1 is a construction diagram showing a working robot according to a first embodiment of the invention and has two multifunctional arms and two moving arms. This working robot is used for a manned module in a space station. In FIG. 1, numeral 81 designates an M/D shield which has been described with reference to FIG. 34 and which is provided with two T-handle sockets 82 at two portions. By using these T-handle sockets 82, the working robot of the first embodiment fixes and moves its own position, as will be described in detail.

In FIG. 1, numeral 1 designates a body which is provided with two openings 2a and 2b in its lower face. These openings 2a and 2b are sized to match the T-handle sockets 82 mounted in the M/D shield, as located at rather arbitrary positions, so that their spacing may correspond to the arbitrary spacing of the T-handle sockets 82. On the upper or side faces of the body 1 containing the openings 2a and 2b, there are individually fixed moving arms 10 and 11.

In the openings 2a and 2b of the body 1, there are individually disposed piston adapters 3, each of which extends vertically through the moving arm 10, 11 on the upper face so that it engages, when stretched, with the T-handle socket 82 of the M/D shield 81 and leaves the same when retracted. In each of the openings 2a and 2b, on the other hand, there is disposed a camera 4 and a light 5 for confirming the adapter shape. All of these components 3, 4 and 5 are wired with and remotely controlled by a not-shown control unit disposed in the robot or a separate module.

On the upper face of the body 1, the two moving arms 10 and 11 are longitudinally fixed. For the individual moving arms 10 and 11, two arms 14a and 14b are jointed at joints 15a and are fixed at joints 15b to the body 1, and manipulation tools 16 are connected at joints 15c to the other ends of the arms 14a. To the side face of each manipulation tool 16, there are attached a camera 12 and a light 13. By the not-shown control unit, this light 13 is lit, and the image of the camera 12 is retrieved so that its data are processed to monitor the situations and confirm the location. The manipulation tool 16 is equipped with either an adapter for gripping the heads of bolts at the four corners of the MID shield 81 or a screw adapter for removing the bolts and fixing the arm.

At the central portion of the body 1, there are fixed in parallel on the two sides two multifunctional arms 20 and 21. For these multifunctional arms 20 and 21, two arms 23a and 23b are jointed at joints 24a and are fixed at joints 24b to the body 1, and manipulation tools 22 are mounted at joints 24c on the other ends of the arms 23a and 23b.

Figure 2A:
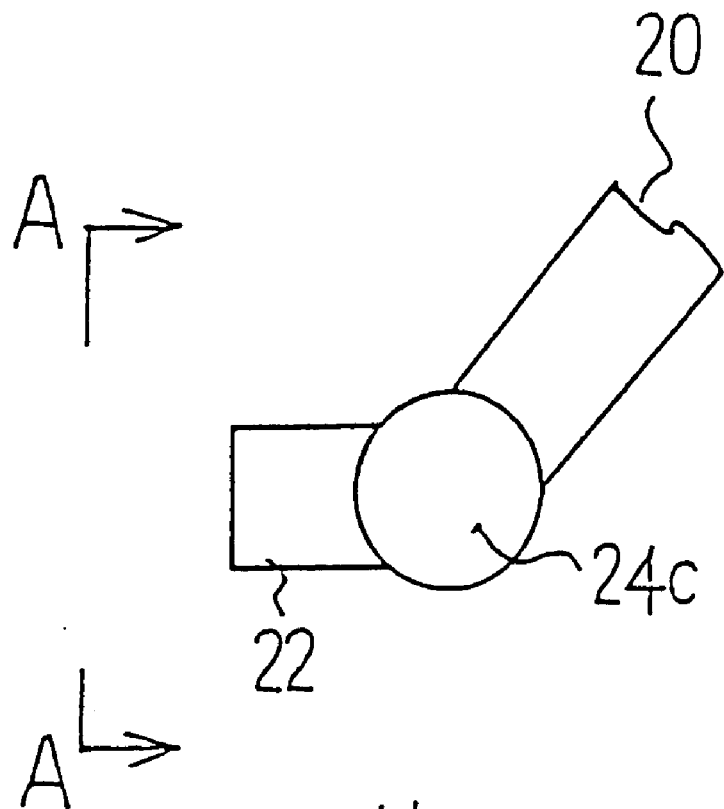
FIGS. 2(a) and (b) show the leading end of a multifunctional arm of the working robot shown in FIG. 1, and (a) is a construction diagram of a manipulation tool, and (b) is a view taken in the direction of arrows A—A of (a).
Figure 2B:
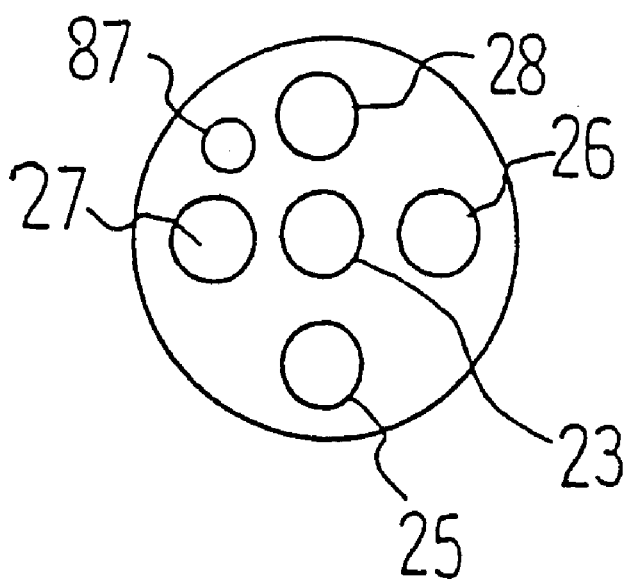

The manipulation tools 22 of the multifunctional arms 20 and 21 will be described in detail with reference to FIGS. 2(a) and (b). In FIGS. 2 (a) and (b), (a) shows the manipulation tool 22 of the multifunctional arm 20, and (b) is a view taken in the direction of arrows A—A of (a). In FIGS. 2(a) and (b), at a center of the manipulation tool 22, there is disposed a piston adapter 23 which can be inserted, when protruded, into the T-handle socket 82 of the M/D shield 81. Around the piston adapter 23, there are further arranged a TV camera 28, a light 25, an insulator removing adapter 26, an unbolting driver 27 and an arm fixing screw adapter 87.

The light 25 and the TV camera 28 are controlled by the not-shown control unit to take an image with the TV camera 28 by illuminating with the light 25. The adapter 26 is attached to the lower face of the M/D shield 81 to remove the insulator. The driver 27 removes the bolts from the four corners of the M/D shield 81.

Figure 3:
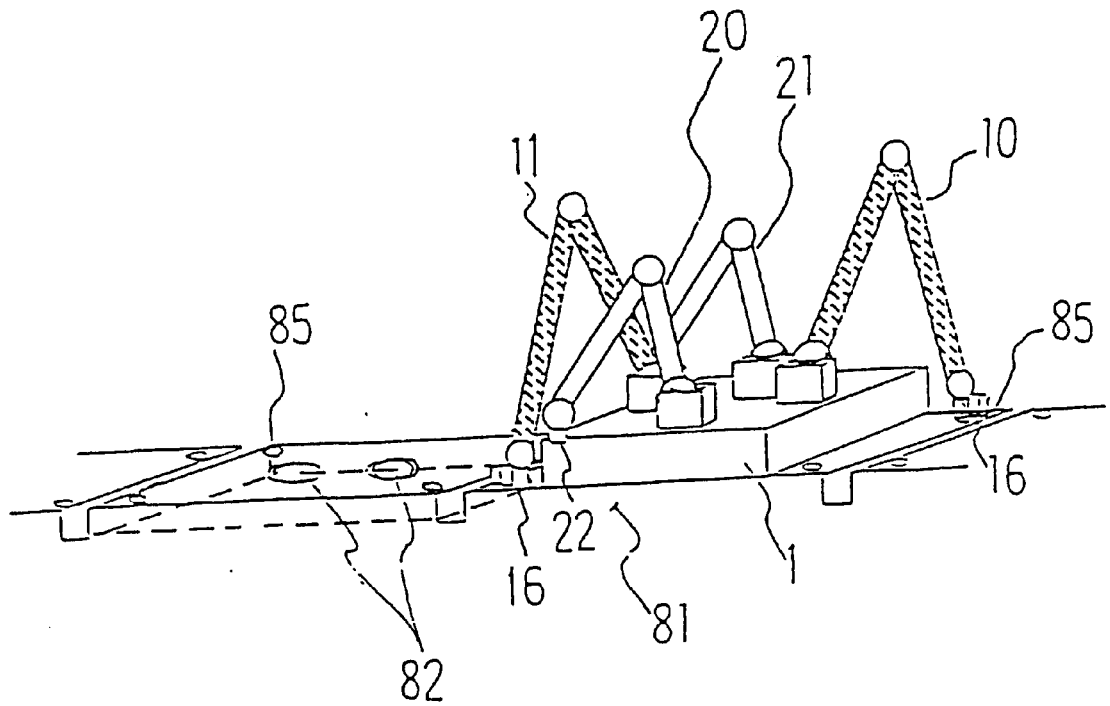
FIGS. 3(a) and (b) present perspective views for explaining the functions of the working robot according to the first embodiment of the invention, and (a) shows the fixing of the working robot, and (b) shows the removal of a M/D shield.
Figure 3:
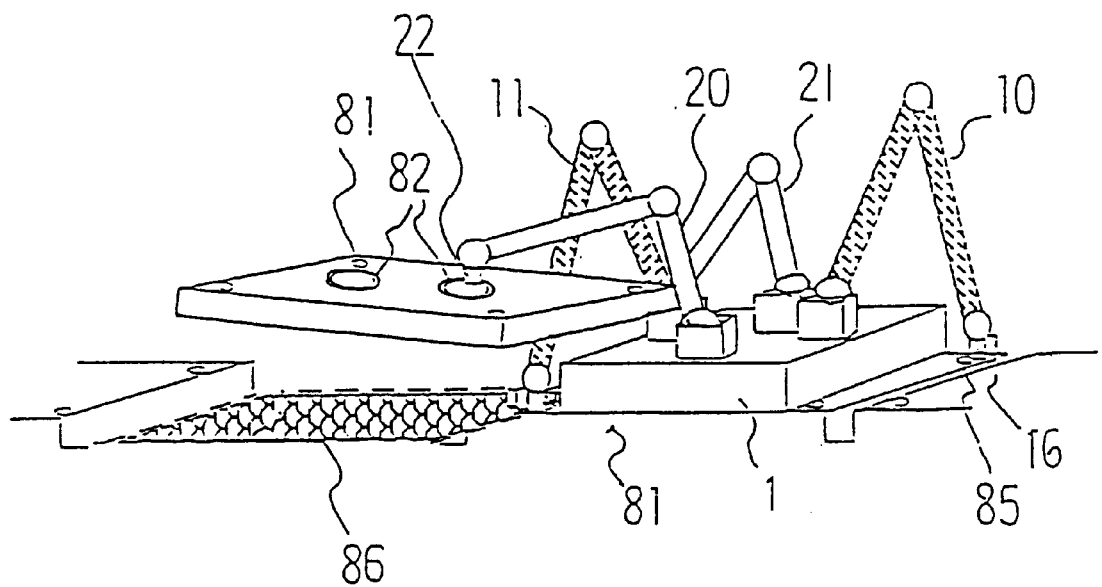

FIGS. 3(a) and (b) present views for explaining the functions of the working robot according to the first embodiment of the invention, and (a) shows the state in which the working robot is fixed at a position over the M/D shield 81, and (b) shows the state in which the M/D shield 81 is removed and lifted.

In FIG. 3(a), the body 1 is fixed on the face of the MID shield 81, as has been described with reference to FIG. 2, by inserting the piston adapter 3 into the T-handle socket 82 of the M/D shield 81. The two moving arms 10 and 11 hold their own positions by gripping the heads of bolts 85 at the corners of the M/D shield 81 with their leading manipulation tools 16.

In FIG. 3(b), the multifunctional arm 20 is extended from the state of (a) to insert its leading manipulation tool 22 into the T-handle socket 82 of the M/D shield 81 ahead, and the piston adapter 3 of the manipulation tool 22 is extended and fixed in the socket thereby to lift the MID shield 81. Here, an insulator 86 is laid below the lower face of the M/D shield 81. Thus, the working robot is enabled to fix its own position on the M/D shield 81 by the piston adapters 3 of the body 1 and by the moving arms 10 and 11 and to catch and lift the M/D shield 81 ahead by the multifunctional arms 20 and 21.

Figure 4:
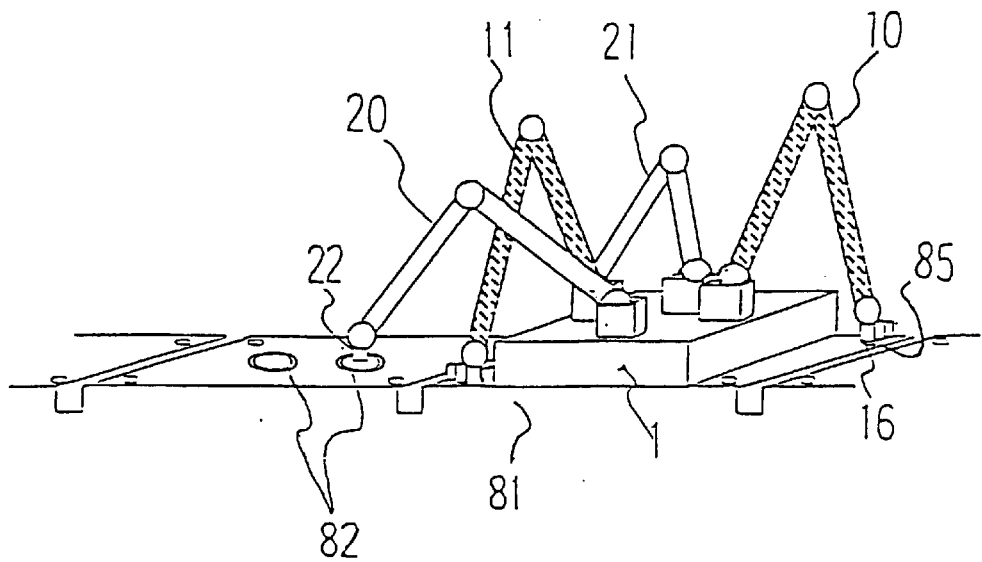
FIGS. 4(a) and (b) present perspective views showing the working state of the working robot according to the first embodiment of the invention, and (a) shows the fixing of the M/D shield, (b) shows the removal of bolts, and (c) shows the removal of the M/D shield.
Figure 4:
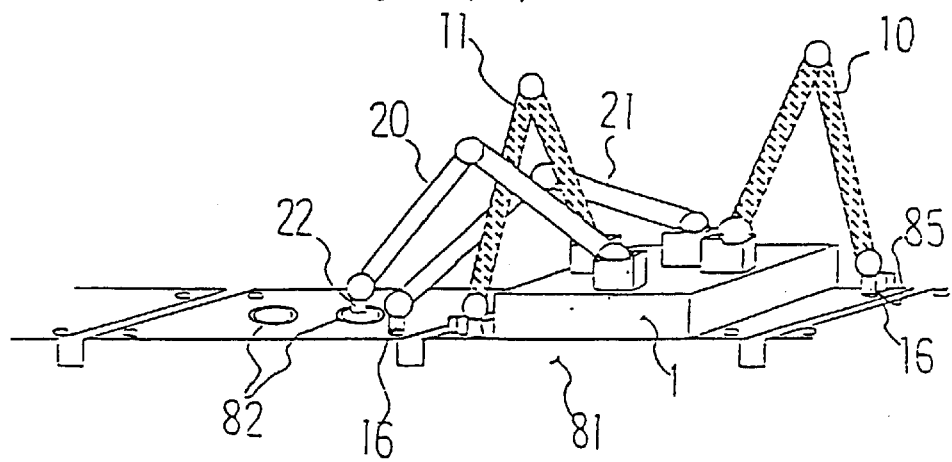
Figure 4:
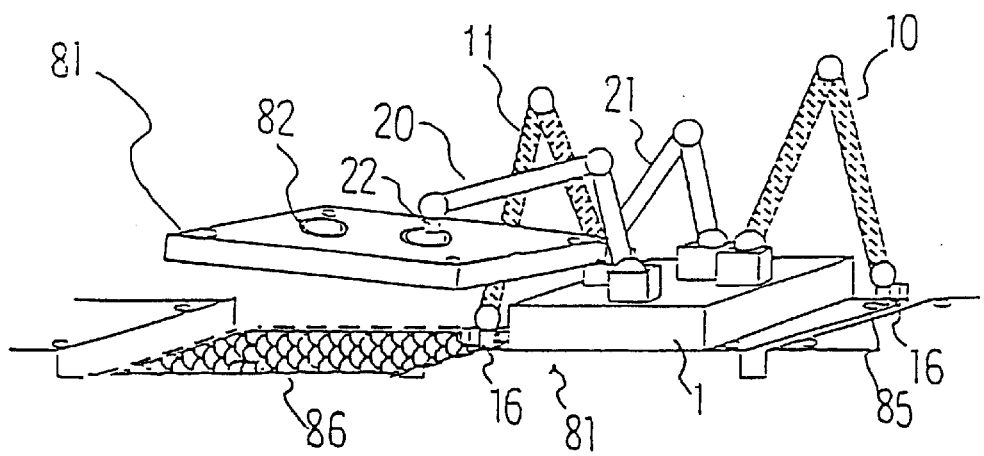

FIGS. 4(a)–(c) present views showing the work of replacing the M/D shield 81 in the working robot according to the first embodiment of the invention. In FIG. 4(a), the working robot acts, as described at in FIG. 3(a): to fix the piston adapter 3 of the body 1 by inserting it into the T-handle sockets 82 of the M/D shield 81; to fix the positions of the M/D shield 81 by gripping the heads of the bolts 85 at the corners of the M/D shield 81, as well, with the manipulation tools 16 of the moving arms 10 and 11; and to insert and fix the piston adapter 23 of the manipulation tool 22 into the T-handle socket 82 of the M/D shield 81 by extending the multifunctional arm to insert the manipulation tool 22 into the T-handle socket In FIG. 4(b), the multifunctional arm 21 is further extended from the state of (a) to the M/D shield 81 ahead, and the unbolting driver 27 of the manipulation tool 22 at its leading end is fitted on the bolt heads at the four corners to remove and accommodate the bolts 85 in the manipulation tool 22.

Next, in FIG. 4(c), the multifunctional arm 20 is manipulated from the state of (b) to lift and remove the M/D shield 81. The insulator 86 is laid below the M/D shield 81. Next, the other multifunctional arm is extended, although not shown, and the insulator removing adapter 26 in the manipulation tool 22 at the leading end is manipulated to remove the insulator 86 likewise.

FIG(s). 5(a)–(c) present views showing the movement of the working robot of the first embodiment of the invention, and (a) shows the sane state as that of FIG. 3(a). The body 1 and the M/D shield 81 are fixed by engaging the piston adapter 3 and the T-handle socket 82 with each other, and the manipulation tools 16 of the moving arms 10 and 11 also grip the heads of the bolts 85 of the M/D shield 81 to fix the entirety.

Figure 5A:
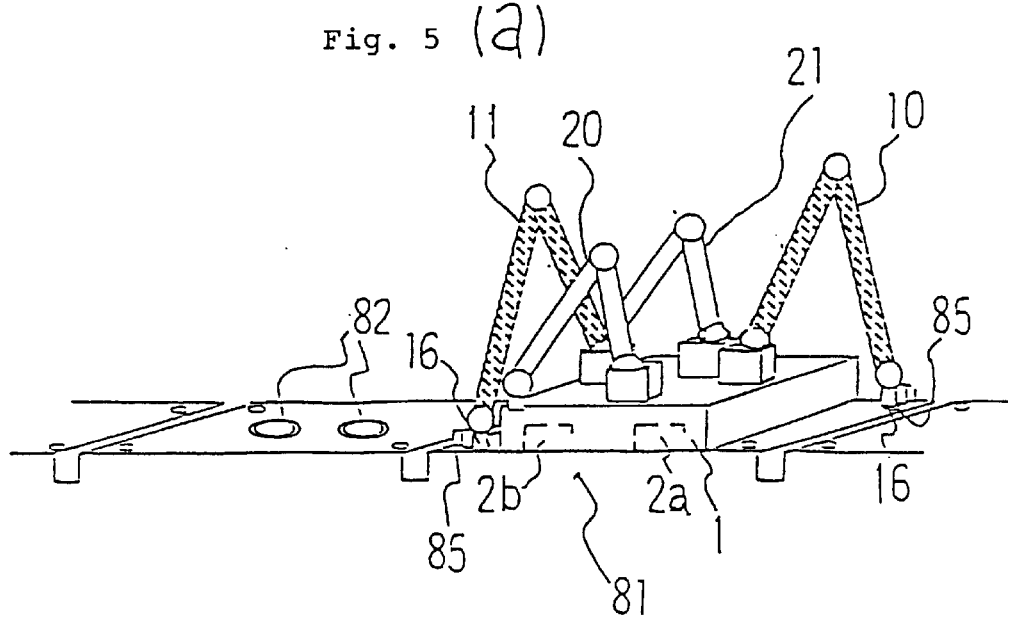
FIGS. 5(a)–(c) present perspective views showing the moving state of the working robot according to the first embodiment of the invention, and (a) shows the fixing of the M/D shield, (b) shows the extension of a moving arm, and (c) shows the movement of the same.
Figure 5B:
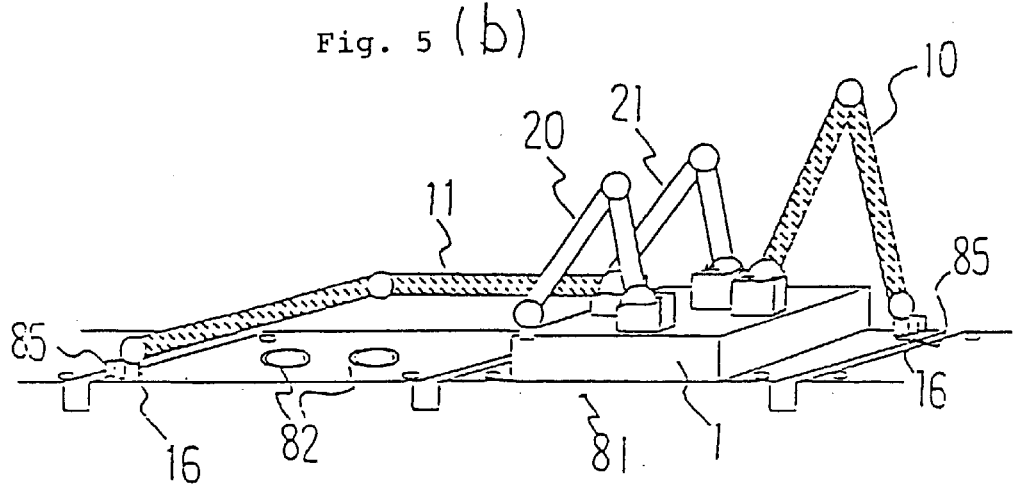

In FIG. 5(b), the moving arm 11 moves from the state (a) to leave the bolt 85 having been gripped thereby at an initial stage, and is extended to the M/D shield 81 ahead to insert its manipulation tool 16 into the bolt at the foremost corner to grip the head of the bolt 85 with the manipulation tool 16. Next, at (c), the internal mechanism of the body 1 is manipulated to retract the piston adapter 3 of the body 1 from the T-handle socket 82, and the moving arms 10 and 11 are manipulated to float the body 1 from the M/D shield 81 and to move the body 1 toward the M/D shield 81 ahead.

Figure 5C:
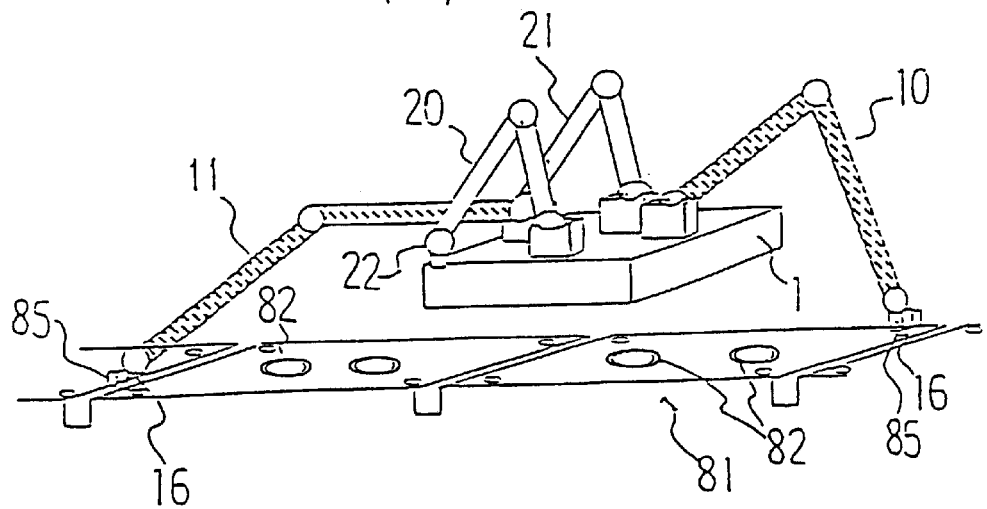
Figure 6A:
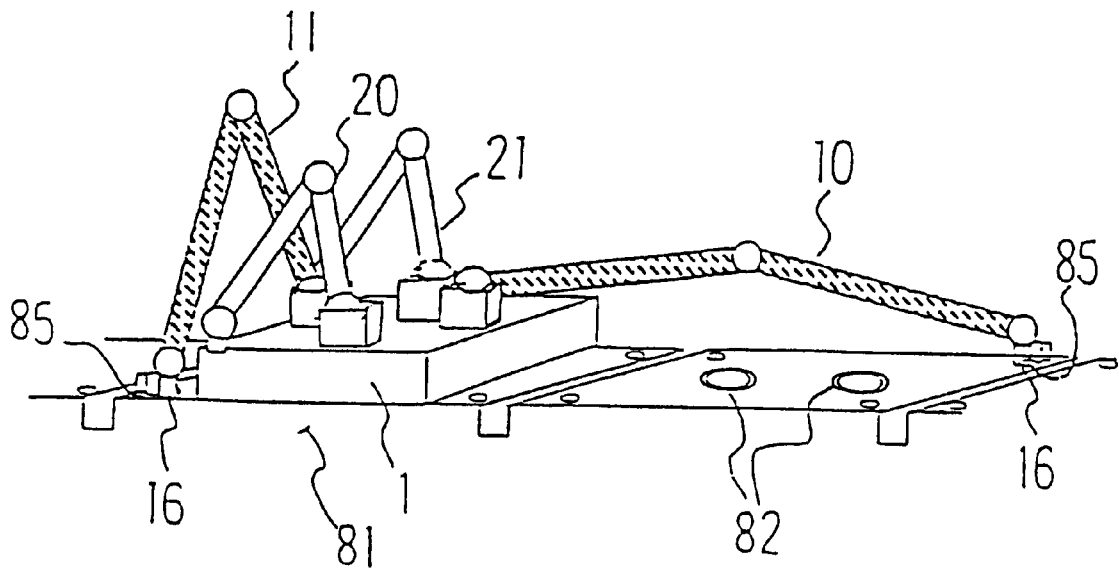
FIGS. 6(a) and (b) present perspective views continued from FIG. 5, and (a) shows the fixing of a body on the MID shield at the destination, and (b) shows the state of the movement completion.
Figure 6B:
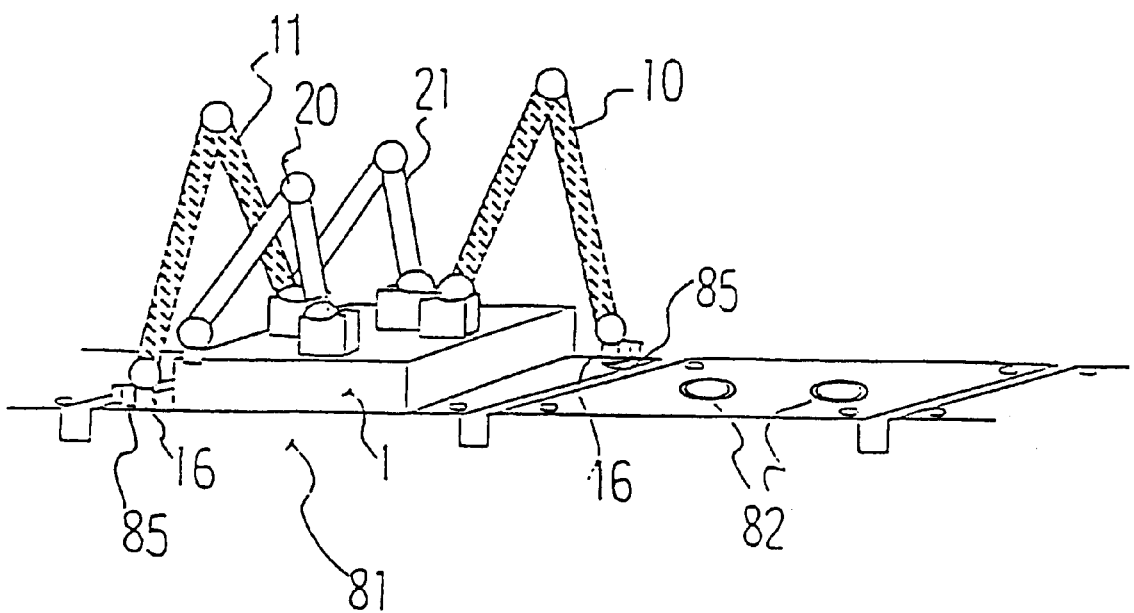

FIGS. 6(a) and (b) show a continuation of FIGS. 5(a)–(c). At FIG. (a), the moving arm 10 is further extended from the state of FIG. 5(c), and the moving arm 11 is contracted to mount the body 1 on the M/D shield 81 ahead. The internal mechanism is manipulated to insert the piston adapter 3 into the T-handle socket 82 thereby to fix the body 1. Next, at (b), the initial bolt grip by the manipulation tool 16 of the moving arm 10 is released, and the moving arm 10 is contracted to grip the bolt 85 of the M/D shield 81, thus completing the movement to the M/D shield 81 ahead.

According to the working robot of the first embodiment thus far described: the piston adapter 3 of the body 1 is fixed in the T-handle socket 82 of the M/D shield 81; the M/D shield 81 to be replaced is fixed by inserting the manipulation tool 22 of the multifunctional arm 20 into the T-handle socket 82; the bolts 85 at the four corners are removed by the manipulation tool 22 of the other multifunctional arm 21; and the M/D shield 81 to be replaced is lifted by the multifunctional arm 20. In this state, the moving arms 10 and 11 are extended/contracted to move over the M/D shield 81 by gripping the bolt heads of the M/D shield 81. When the M/D shield 81 is to be attached, the bolts 85 are fastened by reversing the actions previously discussed. Thus, it is possible in the space without any man power to replace the M/D shield 81 of the house module or to inspect the surrounding structure precisely.

Figure 7A:
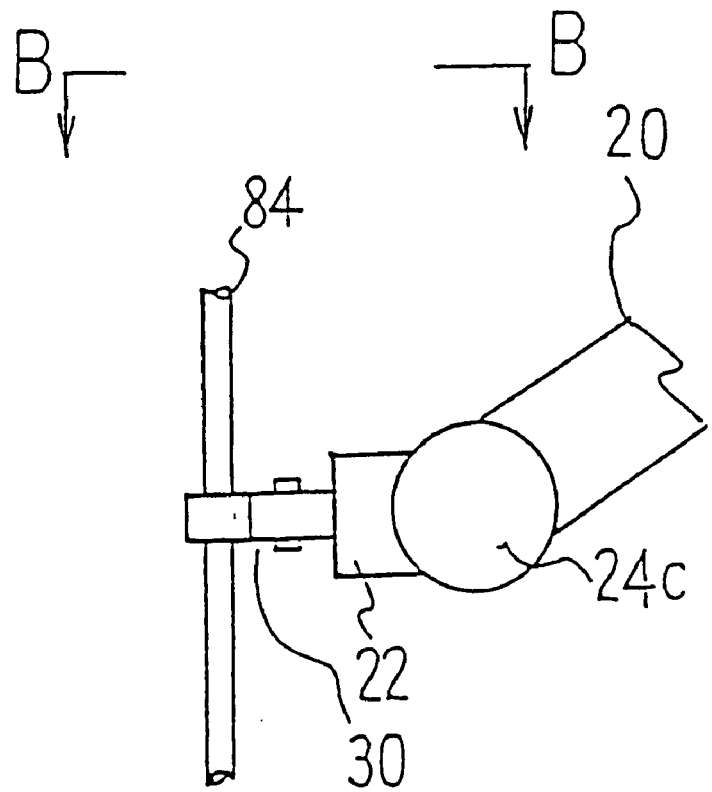
FIGS. 7(a) and (b) show the leading end of the multifunctional arm of a working robot according to a second embodiment of the invention, and (a) is a diagram showing the state in which a hand rail is gripped by a manipulation tool, and (b) is a view taken in the direction of arrows B—B of (a).

FIGS. 7(a) and (b) show the leading end of the multifunctional arm of a working robot according to a second embodiment of the invention, and (a) is a diagram showing the state of a leading end manipulation tool, and (b) is a view taken in the direction of arrows B—B of (a). In this second embodiment, the structures other than the multifunctional arms are identical to those of the first embodiment and are omitted from FIG. 7, and the characteristic portions will be described.

Figure 7B:
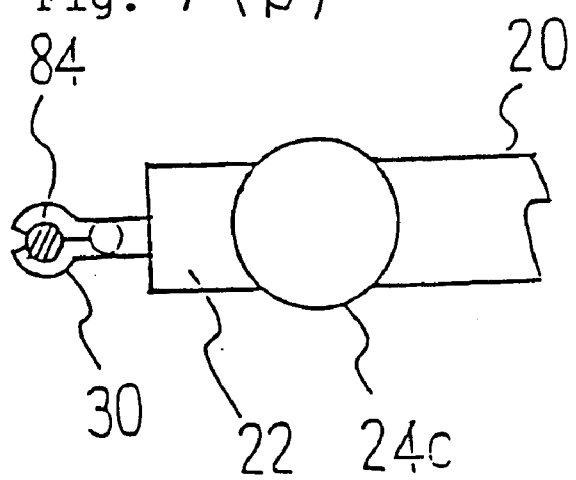
Figure 34:
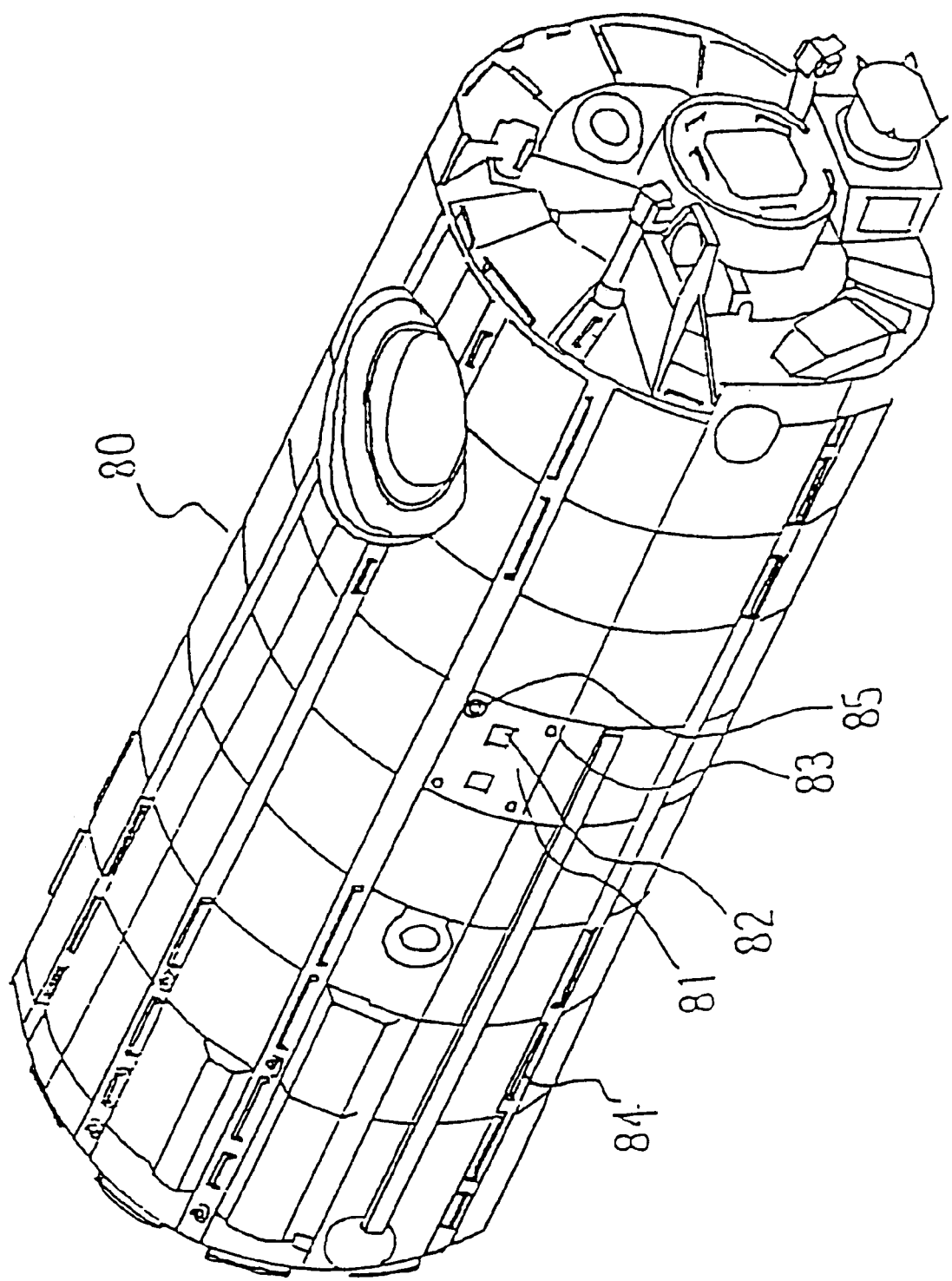
FIG. 34 is an exterior view of a prior art experimental house module in space.

To the leading end of the multifunctional arm 20 or 21, as shown in FIG. 7, there is attached through the joint 24c the manipulation tool 22, which is equipped with a hand rail gripping hand 30 either in place of an unnecessary one of the individual functions shown in FIGS. 29(a) and (b) or in addition to the functions shown in FIGS. 2(a) and (b). This hand rail gripping hand 30 can extend, when necessary, to grip the hand rail 84 attached to the outer periphery of the house module 80, as shown in FIG. 34, to support the robot body on the house module 80. Therefore, the working robot has a higher degree of freedom for movement than that of the first embodiment so that it can move more easily.

Figure 8:
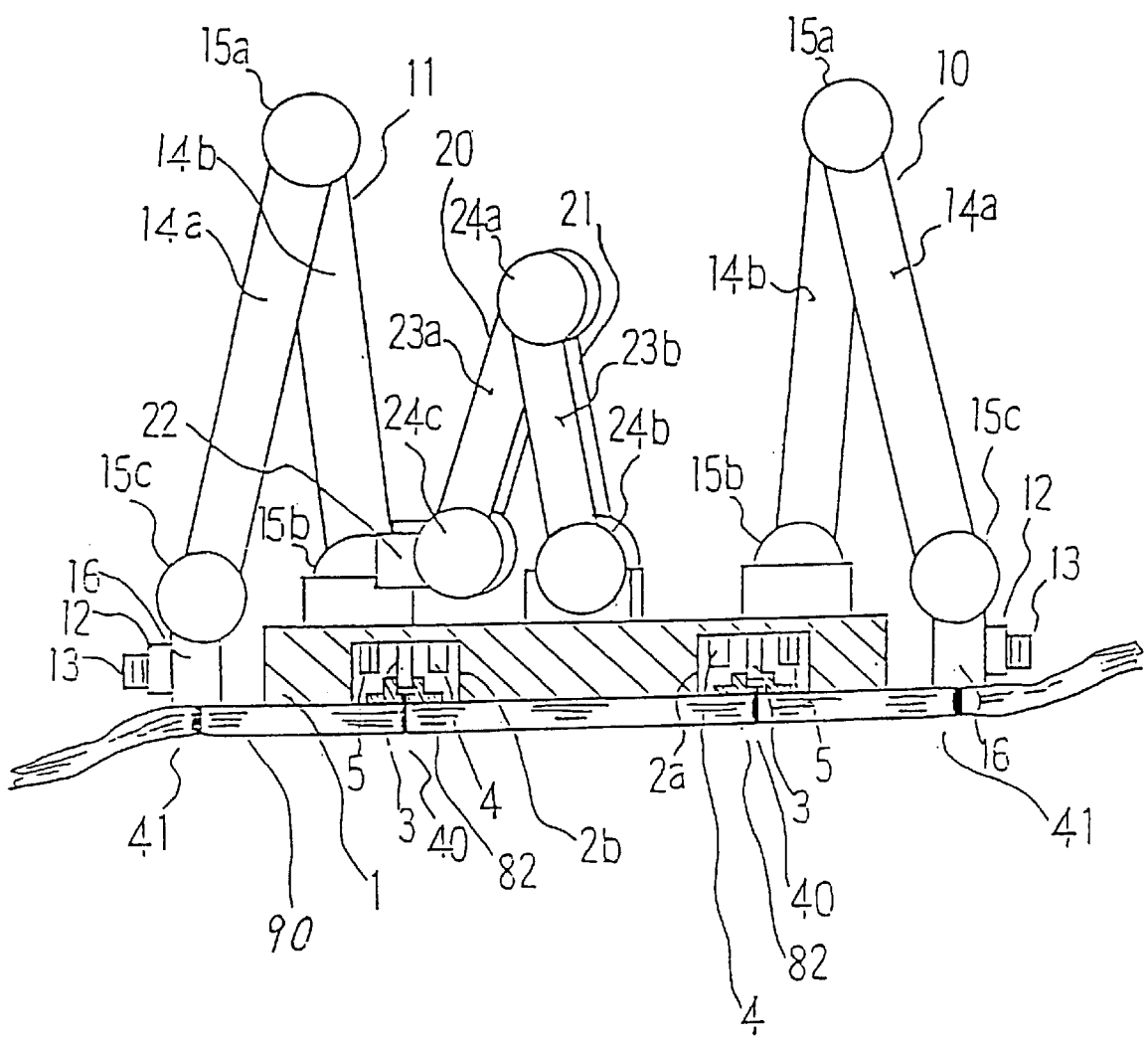
FIG. 8 is a construction diagram of a working robot according to a third embodiment of the invention.

FIG. 8 is a construction diagram of a working robot according to a third embodiment of the invention. This third embodiment is characterized in that the openings 2a and 2b in the body 1 and the manipulation tools 16 at the leading ends of the moving arms 10 and 11 are equipped with drills or fixing bits (as will be called the "drills") 40 and 41 in place of the piston adapters 3 and 23. The structure is identical to that of the first embodiment shown in FIG. 1.

Although the first embodiment is intended to inspect and replace the M/D shields 81 of the experimental house module 80 or to examine the peripheral structure, the third embodiment can fix the robot on the ground 90 of not only the earth but also the Mars or the moon and is enabled to fix the body 1 on the ground 90 by protruding the drills 40 from the openings 20a and 20b of the body 1 and by turning or piling the drills 40 into the ground 90. By protruding the drills 41 from the insides of the manipulation tools 16 at the leading ends of the moving arms 10 and 11, on the other hand, the drills 41 can be likewise protruded to fix the robot on the ground 90. By thus alternating the fixing (or screwing) and removing (or unscrewing) of the drills, the moving arms 10 and 11 can be extended/contracted like in the first embodiment to move the body 1 on the ground 90.

By fixing the body 1 and the moving arms 10 and 11 on the ground 90 with the drills 40 and 41, according to the working robot of the third embodiment thus far described, it is possible to acquire, inspect or perform various manipulations of the ground 90 or its situations by utilizing the camera with the manipulation tools 22 at the leading ends of the multifunctional arms 20 and 21. On the other hand, the working robot can move to effect the movement, inspection and various work not only around the house module, but also on the satellite on which it lands.

Figure 9:
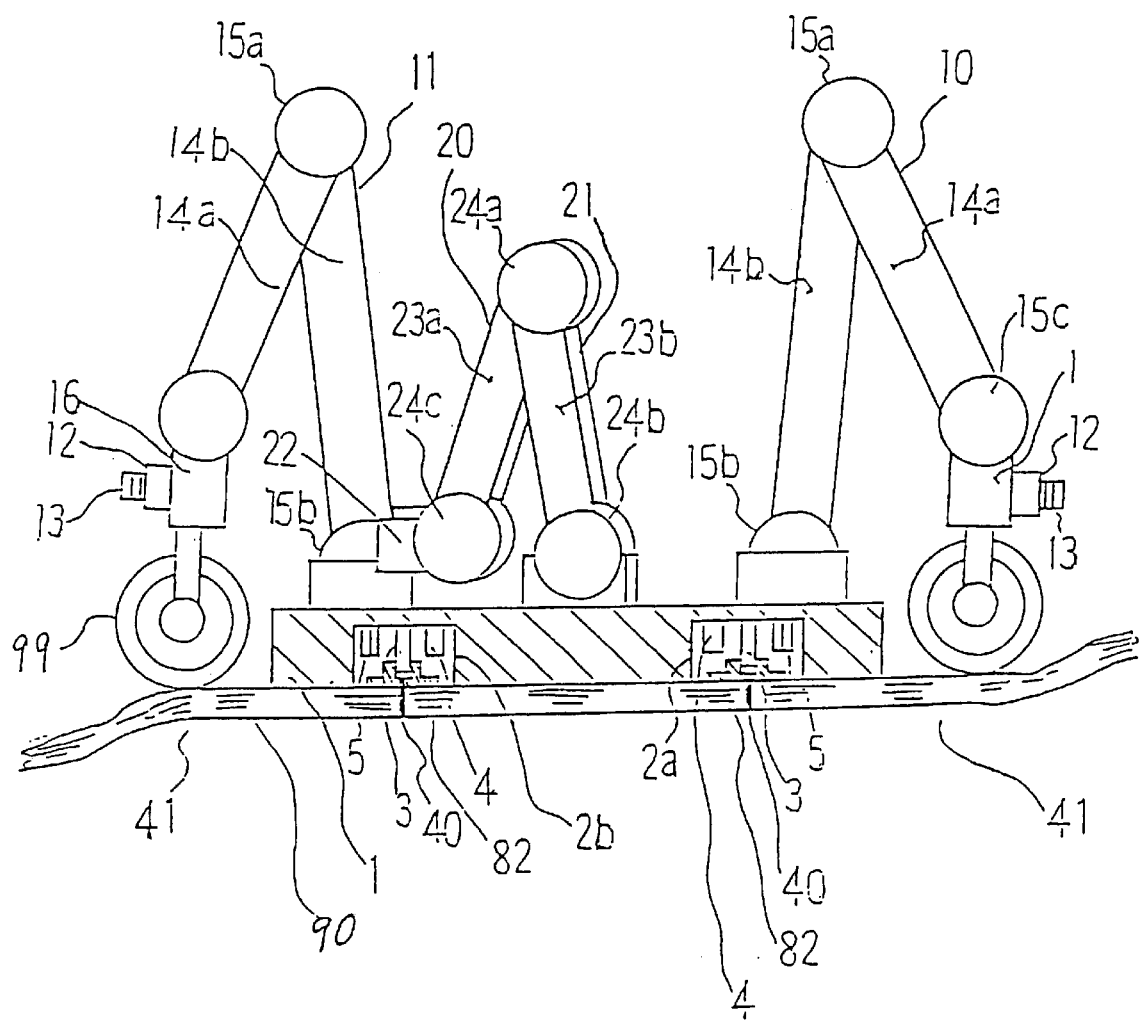
FIG. 9 is a construction diagram of a working robot according to a fourth embodiment of the invention.

On the other hand, FIG. 9 shows a working robot according to a fourth embodiment of the invention. The fourth embodiment of the invention is characterized in that the manipulation tools 16 are equipped with wheel adapters 99 in place of the drills or fixing bits 40 and 41 in the third embodiment, so that the working robot can move smoothly and speedily.

Here, the working robot of the invention is exemplified in the first and second embodiments by replacing and moving the M/D shield 81 of the experimental house module in the space and in the third embodiment by moving on the ground 90. By replacing the drills/adapters by adapters suited for individual movements, however, the working robot can be employed not only in space, but also in an atomic power plant or in various factories such as a semiconductor manufacturing factory and can be useful for unmanned situations.

Figure 10:
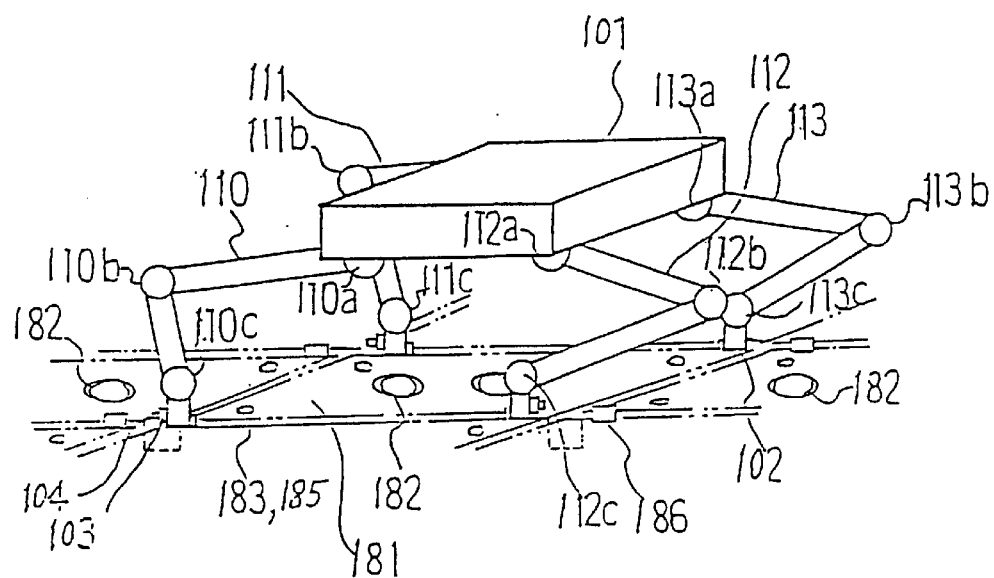
FIG. 10 is a perspective view showing a working robot according to a fifth embodiment of the invention.

FIG. 10 is a construction diagram showing a working robot according to a fifth embodiment of the invention, which has four multifunctional arms and is used in a manned module in the space station. In FIG. 10, numeral 181 designates a M/D shield which has been described with reference to FIG. 34 and which is equipped with T-handle sockets 182 at its two portions. In the four corners of the M/D shield 181, on the other hand, there are formed four bolt holes 183 for fixing the M/D shield 181 on the module body 80 with bolts 185.

To the periphery of the module body 80, on the other hand, there are attached in an axial direction structural beams, which are equipped at a predetermined pitch with working sockets 186. Each working socket 186 is provided for fixing a jig such as a working bed thereon for a worker when the periphery of the module body 80 is to be maintained and inspected. The socket 186 fixes the jig by inserting thereinto a fixing tool of the jig. The working robot of the fifth embodiment is enabled to fix its own position and to move by making use of the projections such as the working sockets 186 or the heads of the bolts 185, as will be described in detail.

In FIG. 10, numeral 101 designates a body which is equipped at the four corners of its lower face with four multifunctional arms 110, 111, 112 and 113. The multifunctional arm 110 is connected at joints 110a, 110b and 110c so that it can turn freely in three-dimensional directions. Likewise, the multifunctional arm 111 is connected at joints 111a, 111b and 111c; the multifunctional arm 112 is connected at joints 112a, 112b and 112c; and the multifunctional arm 113 is connected at joints 113a, 113b and 113c, so that the working robot is enabled to move freely by extending/contracting the four arms 110, 111, 112 and 113.

To each of the joints 110c, 111c, 112c and 113c of the individual arms 110, 111, 112 and 113, there is connected a manipulation tool 102. To the side face of the manipulation tool 102, there are attached a camera 103 and a light 104. The image of the camera 103 is fetched by lighting the light 104 by the not-shown control unit, and data from the camera are processed thereby to monitor the situation and to confirm the position. The manipulation tool 102 is equipped with either an adapter for gripping the working socket 186 or for gripping the head of each of the bolts at the four corners of the M/D shield 181, or an adapter for removing the bolts and fixing the arms.

Figure 11A:
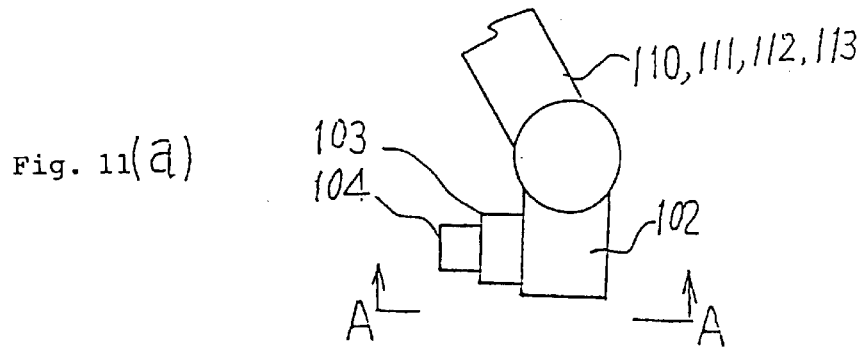
FIGS. 11(a) and (b) show the leading end of the multi-functional arm of the working robot shown in FIG. 10, and (a) is a construction diagram of a manipulation tool, and (b) is a view taken in the direction of arrows A—A of (a).

Next, the manipulation tool 102 will be described in detail with reference to FIGS. 11(a) and (b). In FIG. 11(a) and (b), (a) shows the manipulation tool 102 of each of the multifunctional arms 110 to 113, and (b) is a view taken in the direction of arrows A—A of (a). In the manipulation tool 102, as shown in (a) and (b), there is disposed at the center a piston adapter 123, which can be inserted, when protruded, into the T-handle socket 182 of the M/D shield 181. On the other hand, the piston adapter 123 is surrounded by a TV camera 120, a light 121, a working socket gripping adapter 122, an insulator removing adapter 124 and an unbolting driver 125.

The light 121 and the TV camera 120 are controlled by the not-shown control unit so that the light 121 is lit to catch the image of the surface of a structure with the TV camera 120. The adapter 124 removes the insulator which is laid below the M/D shield 181, and the driver 125 removes the bolts from the four corners of the M/D shield 181.

Figure 12A:
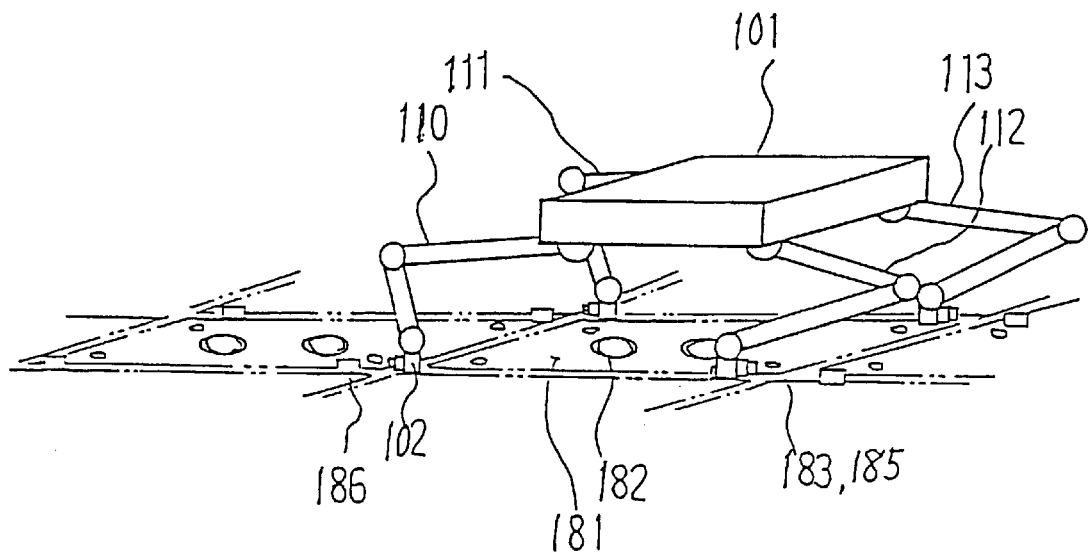
FIGS. 12(a) and (b) present perspective views for explaining the functions of the working robot according to the fifth embodiment of the invention, and (a) shows the fixing of the working robot, and (b) shows the removal of a M/D shield.

FIGS. 12(a) and (b) present views for explaining the functions of the working robot according to the fifth embodiment of the invention, and (a) shows the state in which the working robot is fixed and positioned over the M/D shield 181, and (b) shows the state in which the M/D shield 181 is removed and lifted.

In FIG. 12(a), the body 101 is fixed on the M/D shield 181 by inserting the working socket gripping adapters 122 into the working sockets 186 of the M/D shield 181, as has been described with reference to FIGS. 10 and 11(a) and (b), and the four multifunctional arms 110, 111, 112 and 113 hold their own positions by gripping the heads of the working sockets 186 at the corners of the M/D shield 181 with their leading end manipulation tools 102.

Figure 12B:
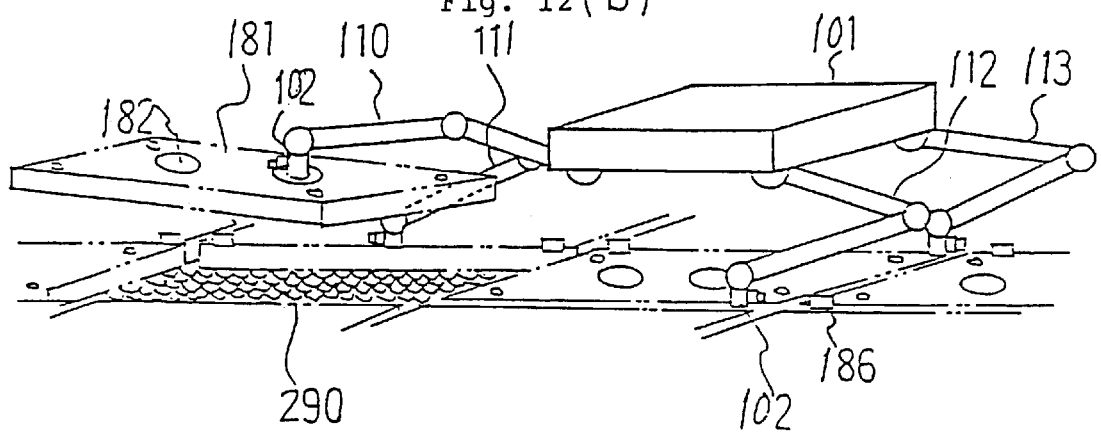

In FIG. 12(b), there is shown the state in which the multifunctional arm 110 is extended from the state of (a) to insert its leading end manipulation tool 102 into the T-handle socket 182 of the M/D shield 181 ahead, in which the bolts 185 of the M/D shield 181 are removed by the multifunctional arm 111, and in which the piston adapter 123 of the manipulation tool 102 of the arm 110 is extended and fixed in the socket to lift the M/D shield 181. Here, an insulator 290 is laid below the lower face of the M/D shield 181. Thus, the working robot is enabled to fix its own position over the M/D shield 181 by the working socket gripping adapters 122 of the manipulation tools 102 of the body 101 and by the multifunctional arms 111, 112 and 113 and to catch and lift the M/D shield 181 ahead by only the multifunctional arm 110.

In the working robot according to the fifth embodiment of the invention, as shown in FIGS. 12(*a*) and (*b*), the four multifunctional arms 110, 111, 112 and 113 are used to grip the working sockets 186 of the surface of the M/D shield 181 with the working socket gripping adapters 122 of the manipulation tools 102 at their leading ends and to move over the M/D shield 181. Of the multifunctional arms 110 to 113, the arm 111 is used to remove the bolts 185 and is manipulated to lift and remove the M/D shield 181. The insulator 290 is placed below the M/D shield 181. Next, another multifunctional arm can be extended, although not shown, to manipulate the insulator removing adapter 124 in its leading end manipulation tool 102 thereby to remove the insulator 290 likewise.

Figure 13A:
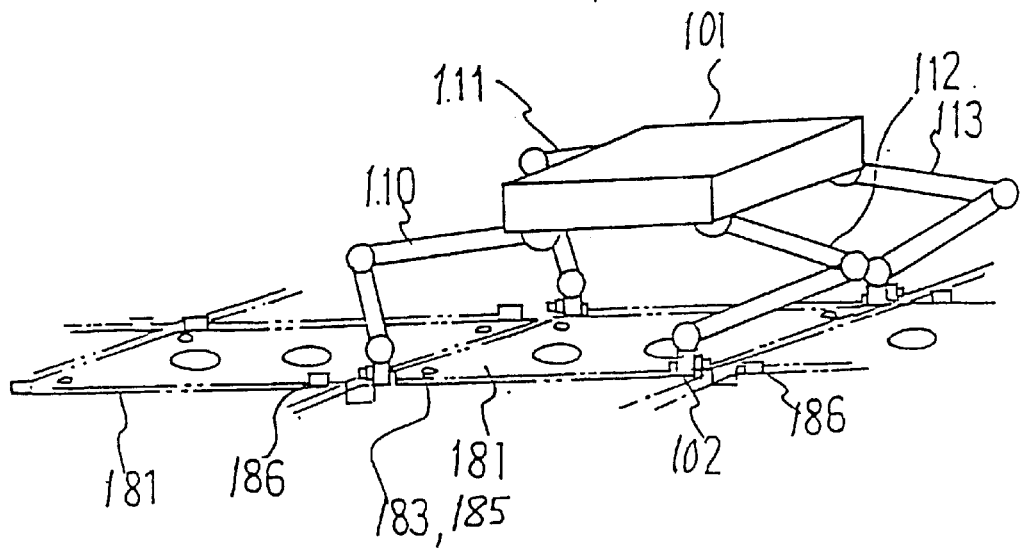
FIGS. 13(a)–(c) present perspective views showing the moving state of the working robot according to the fifth embodiment of the invention, and (a) shows the fixing of the M/D shield, (b) shows the extension of a moving arm, and (c) shows the movement of the same.
Figure 13B:
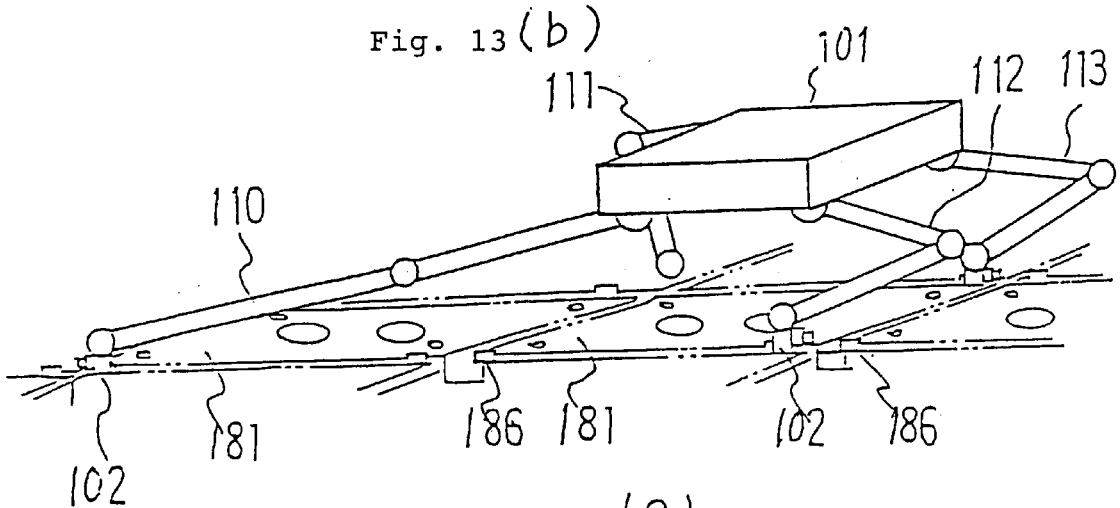
Figure 13C:
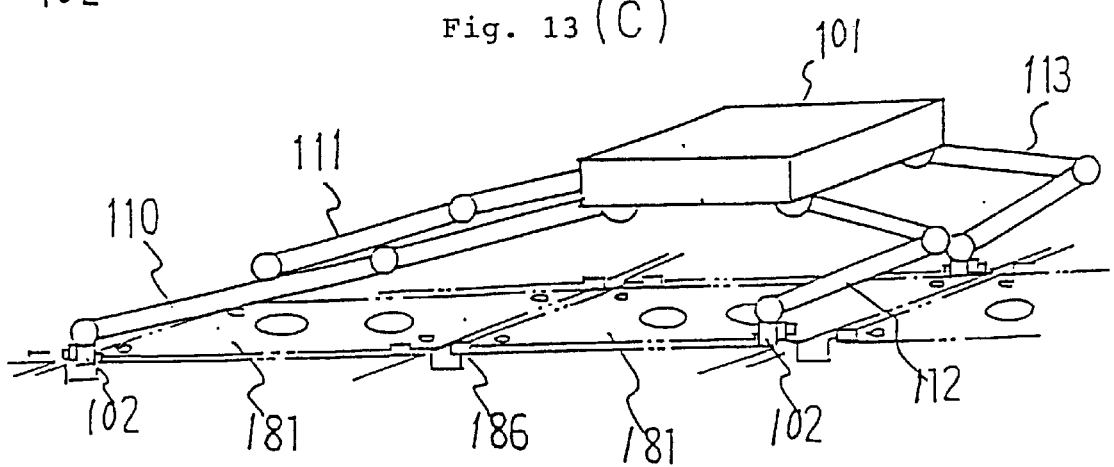

FIGS. 13(*a*)–(*c*) show the movement of the working robot of the fifth embodiment, and (a) shows the same state, as that of FIG. 12(*a*), in which the body 101 and the M/D shield 181 are fixed by gripping either the working sockets 186 of the surface of the M/D shield 181 or the heads of the bolts 185, although not shown, with the working socket gripping adapters 122 of the manipulation tools 102 of the multifunctional arms 110, 111, 112 and 113.

In FIG. 13(*b*), from the state (a), the multifunctional arm 110 ungrips the working socket 186 and is extended to the M/D shield 181 ahead to insert the manipulation tool 102 into the foremost working socket 186 at the four corners thereby to grip the head of the working socket 186 with the working socket gripping adapter 122 of the manipulation tool 102.

Next, at (c), the multifunctional arm 111 ungrips the working socket 186 and is extended to the M/D shield 181 ahead to insert the foremost working socket 186 into the manipulation tool 102 thereby to grip the head of the working socket 186 with the working socket gripping adapter 122 of the manipulation tool 102. In this state, two multifunctional arms 110 and 111 are moved to the M/D shield 181 ahead by one.

Figure 14A:
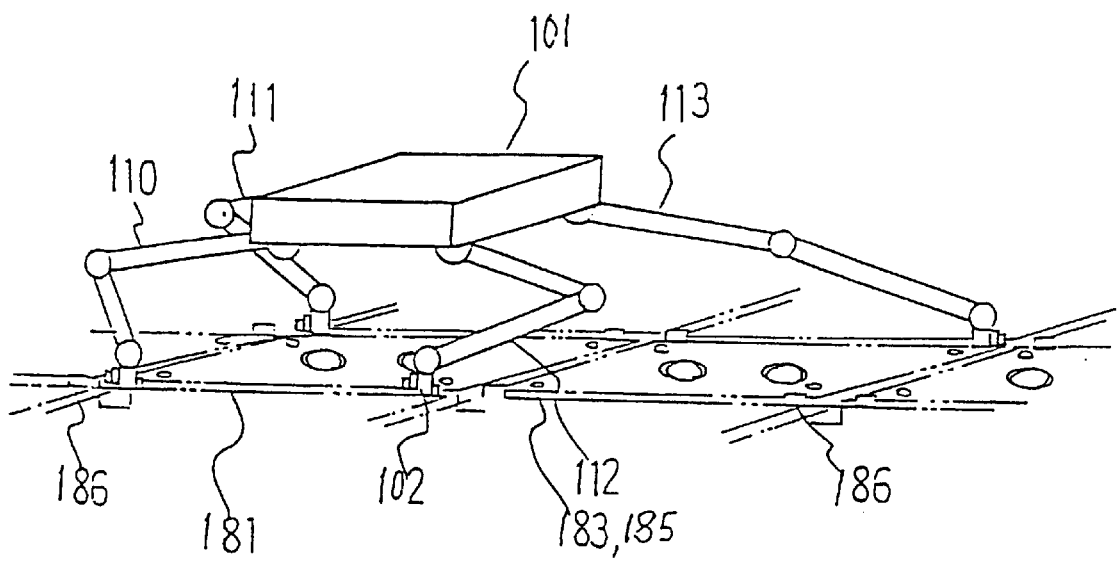
FIGS. 14(a) and (b) present perspective views continued from FIGS. 13(a)–(c), and (a) shows the fixing of a body on the M/D shield at the destination, and (b) shows the state of the movement completion.
Figure 14B:
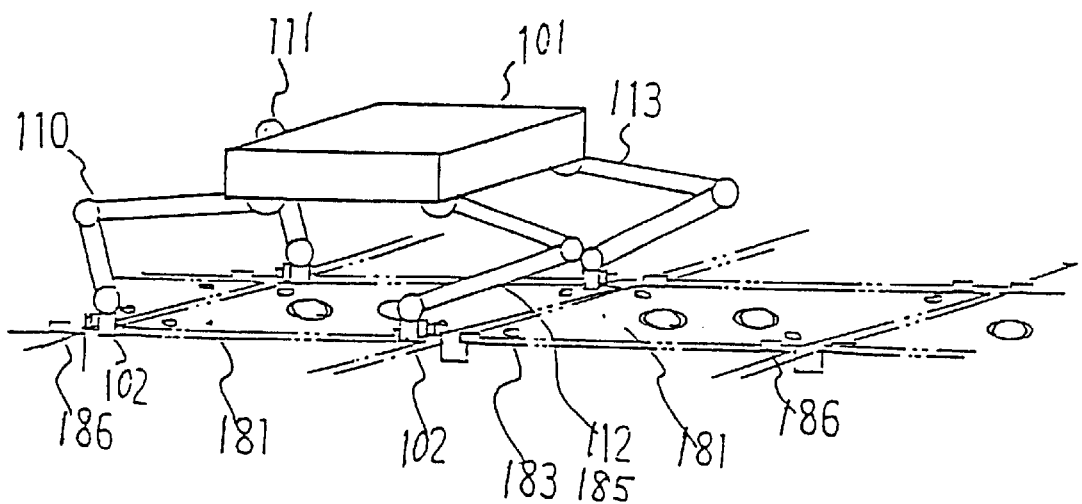

FIGS. 14(*a*) and (*b*) show a continuation of FIGS. 13(*a*)–(*c*). At (a), the multifunctional arms 110 and 111 are contracted, but the multifunctional arm 113 is extended to move the body 101 to the M/D shield 181 ahead by one, and the manipulation tool 102 of the multifunctional arm 112 is moved to the working socket 186 behind the M/D shield 181 ahead by one to thereby grip the working socket 186 with the working socket gripping adapter 122. In this state, the three multifunctional arms 110, 111 and 112 have been moved to over the M/D shield 181 ahead by one.

At (b), the multifunctional arm 113 is contracted to the back working socket 186 of the M/D shield 181 ahead by one to grip the working socket 186 with the working socket gripping adapter 122 of the manipulation tool 102, so that the body 101 can be completely moved to the M/D shield 181 ahead by one. By repeating these actions, the body 101 can be sequentially moved to the M/D shield 181 ahead.

According to the working robot of the fifth embodiment thus far described, the working socket gripping adapters 122 of the manipulation tools 102 are fixed in the working sockets 186 of the M/D shield 181 by the two multifunctional arms 112 and 113. Moreover, the manipulation tool 102 of the multifunctional arm 110 is inserted and fixed in the T-handle socket 182 of the M/D shield 181 to be replaced, whereas the bolts 186 at the four corners are removed by the manipulation tool 102 of the other multifunctional arm 111, and the M/D shield 181 to be replaced by the multifunctional arm 110. In this state, the multifunctional arms 112 and 113 grip the heads of the working sockets 186 of the M/D shield 181 and are extended and contracted to move over the M/D shield 181. When the M/D shield 181 is to be attached, the bolts 185 are fastened by reversing the actions described above. Thus, it is possible without any man power in space to replace the M/D shield 181 of the house module and to inspect the peripheral structure precisely.

Here, the fifth embodiment has been described in the case of the working robot, in which the body 101 is fixed or moved by gripping the working sockets 186 on the M/D shield 181 with the working socket gripping adapters 122 of the manipulation tools 102. However, the body 101 can be fixed or moved by gripping the heads of the bolts 185 in place of the working sockets 186, as has been described hereinbefore.

Figure 15:
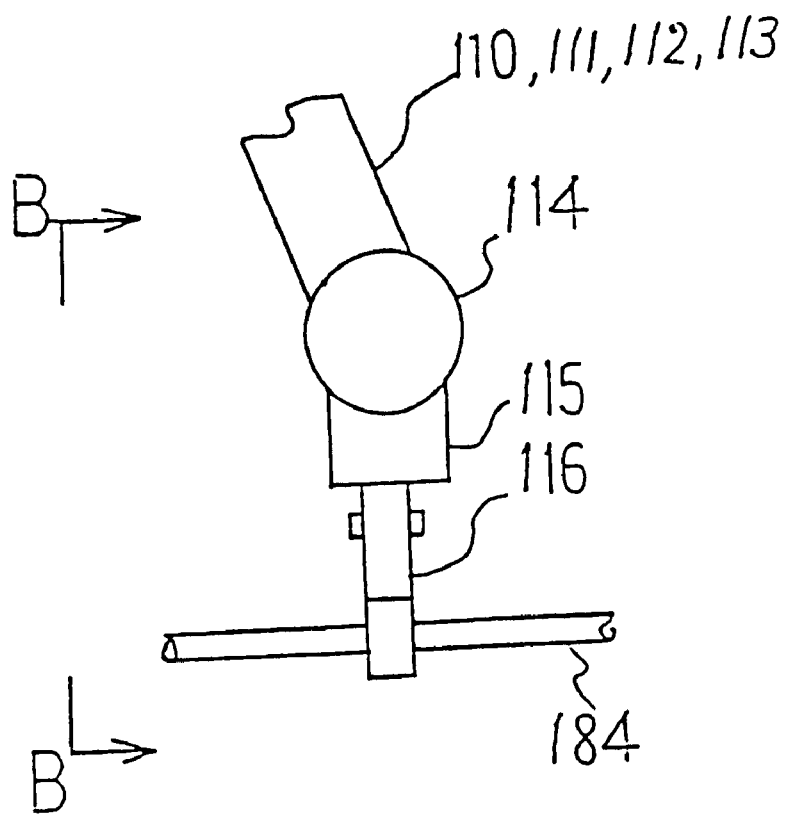
FIGS. 15(a) and (b) show the leading end of the multi-functional arm of a robot according to a sixth embodiment of the invention, and (a) is a diagram he state in which a hand rail is gripped by a manipulation tool, and (b) is a view he direction of arrows B—B of (a).
Figure 15:
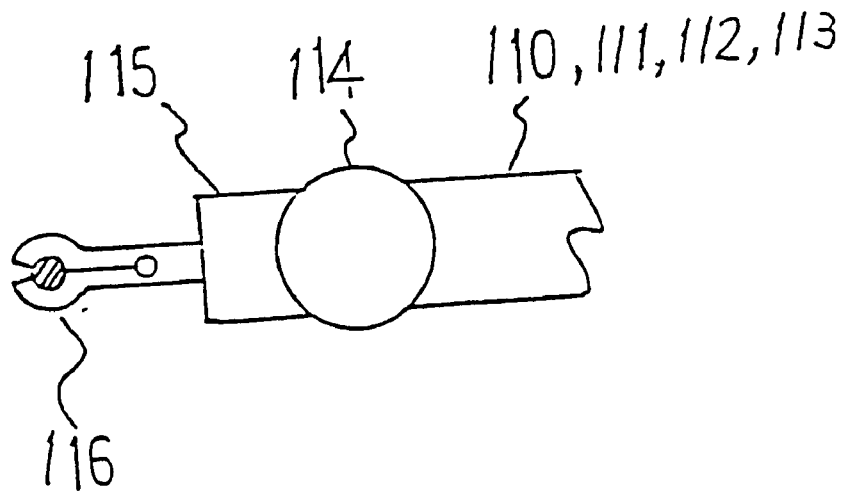

FIGS. 15(*a*) and (*b*) show the leading end of a multifunctional arm of a working robot according to a sixth embodiment of the invention, and (a) shows the leading end manipulation tool, and (b) is a view taken in the direction of arrows B—B of (a). In this sixth embodiment, the structures other than the multifunctional arm are identical to those of the fifth embodiment and will be omitted from FIGS. 15(*a*) and (*b*), and their characteristic portions will be described.

Figure 11B:
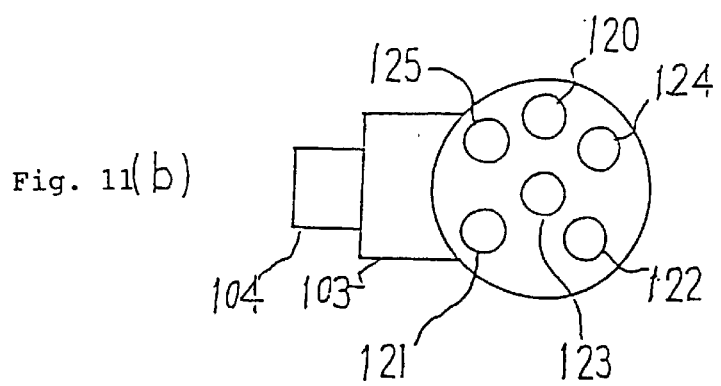

To the leading end of one of the multifunctional arms 110 to 113, as shown in FIGS. 15(*a*) and (*b*), there is attached through a joint 114 a manipulation tool 115. This manipulation tool 115 is equipped with a hand rail gripping hand 116 either in place of an unnecessary one of the individual functions shown in FIGS. 11(*a*) and (*b*) or in addition to the individual functions shown in FIGS. 11(*a*) and (*b*). The hand rail gripping hand 116 is extended, if necessary, to protrude and grip a hand rail 184 attached to the outer periphery of the house module 80, as shown in FIG. 34, so that the robot body can be supported over the house module 80. Therefore, the degree of freedom of motion can be increased to move more easily than the working robot of the fifth embodiment.

Figure 16:
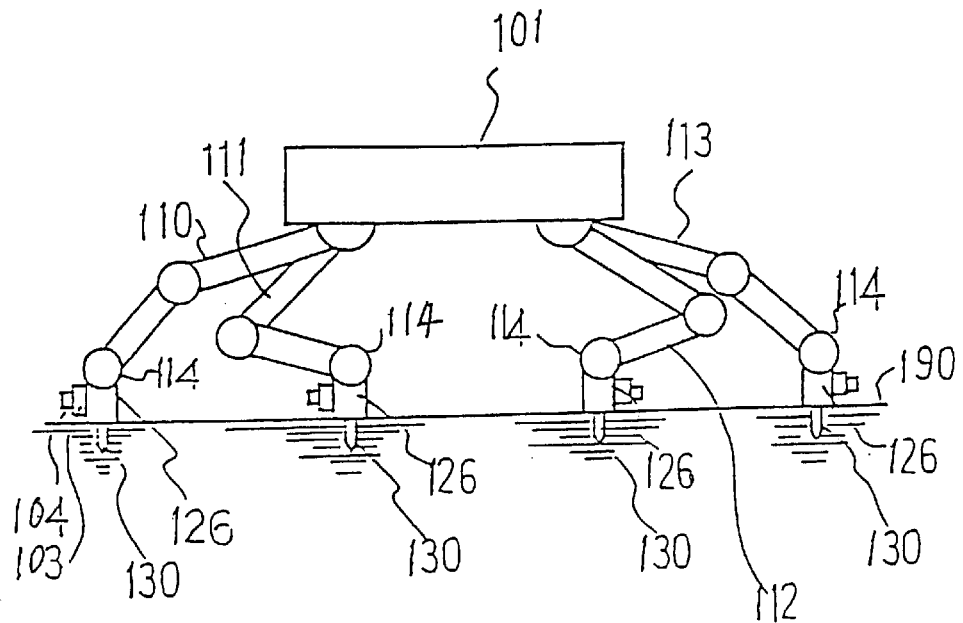
FIG. 16 is a construction diagram of a working robot according to a seventh embodiment of the invention.

FIG. 16 is a construction diagram of a working robot according to a seventh embodiment of the invention. This seventh embodiment is characterized in that the multifunctional arms 110, 111, 112 and 113 in the body 101 are equipped at their individual leading end manipulation tools 126 with drills or fixing bits (as will be called the "drills") in place of the piston adapters 123. The remaining structures are identical to those of the fifth embodiment shown in FIG. 10.

The fifth embodiment has intended to inspect and replace the M/D shield 181 of the experimental house module 80 or to examine the peripheral structure. In this seventh embodiment, however, the robot can be fixed even to the ground 190 of the earth, the Mars, the moon and so on. The body 101 can be fixed over the ground 190 by protruding the drills 130 from the insides of the manipulation tools 126 of the body 101 and by turning or piling the drills 130 into the ground 190. By performing these fixing (screwing) and removing (or unscrewing) actions alternately, the multifunctional arms 110, 111, 112 and 113 can be extended and contracted like the fifth embodiment to move the body 101 over the ground 190.

Figure 17:
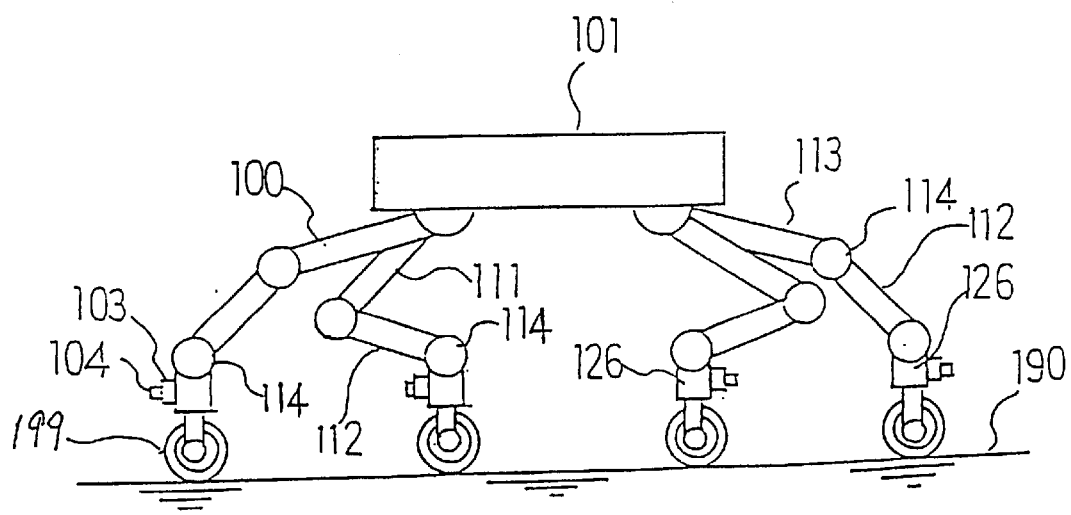
FIG. 17 is a construction diagram of a working robot according to an eighth embodiment of the invention.

On the other hand, FIG. 17 shows a working robot according to an eighth embodiment of the invention. According to the characteristics of the eighth embodiment, more specifically, the manipulation tools 126 are equipped with wheel adapters 199 in place of the drills or fixing bits 130 of the seventh embodiment, so that the robot can be moved smoothly or speedily over the ground 190.

By fixing the body 101 and the multifunctional arms 110, 111, 112 and 113 over the ground 190 with the drills 130, according to the working robot of the aforementioned seventh embodiment, it is possible to perform the data acquisition, the inspection and the various manipulations over or of the ground 190 by the camera 103 with the manipulation tools 126 at the leading ends of the individual multifunctional arms and to move around thereby to perform the movement, the inspection and the various work not only around the house module, but also when the robot lands on the satellite.

Here, the working robot of the invention has been described in the fifth and sixth embodiments, for example, in which the M/D shield 181 of the experimental house module in the space is replaced and moved, and in the seventh embodiment, for example, in which the robot moves over the ground 190. By replacing the drills/adapters by adapters suited for individual movements, however, the working robot can be employed not only in space, but also in the atomic power plant or in the various factories such as the semiconductor manufacturing factory and can be useful for the unmanned situations.

Figure 18:
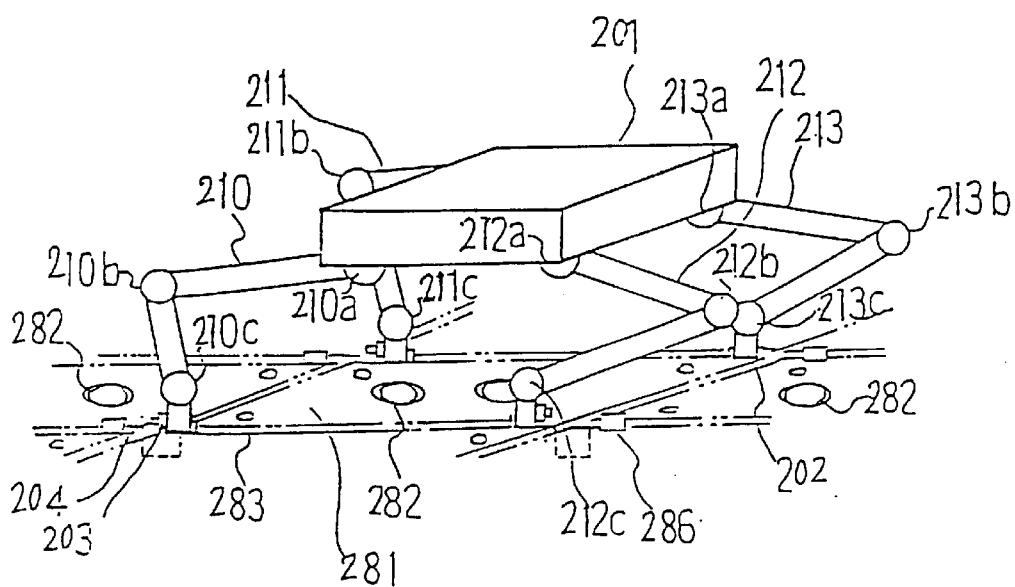
FIG. 18 is a perspective view showing the entire construction of a working robot according to a ninth embodiment of the invention.
Figure 21:
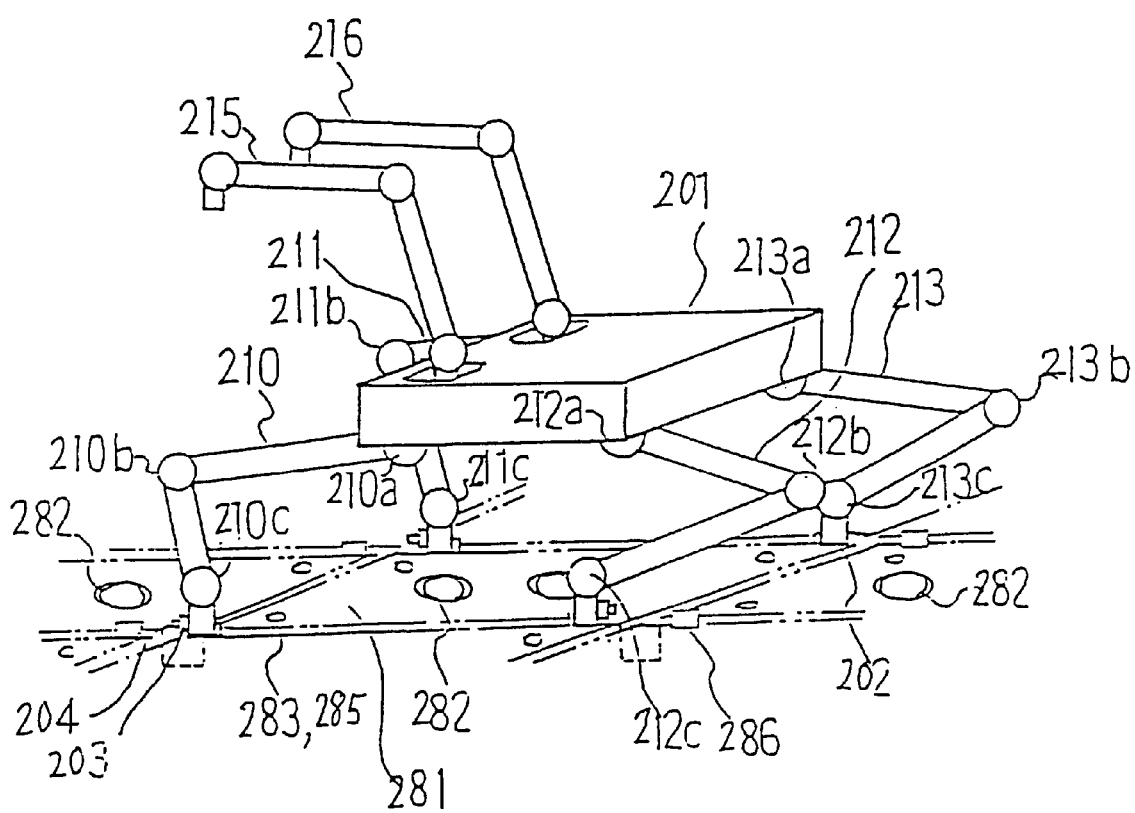
FIG. 21 is a perspective view of a working robot of another type and shows the of the working robot according to the ninth embodiment of the invention.

Next, FIG. 18 is a construction diagram showing an example in which a working robot according to a ninth embodiment of the invention is provided with four multifunctional arms and utilized in a manned module in the space station. In FIG. 18, numeral 281 designates an M/D shield which is equipped with T-handle socket 282 at two portions. In the four corners of the M/D shield 281, on the other hand, there are formed four bolt holes 283 for fixing the M/D shield 281 on the module body 80 so that the M/D shield 281 is attached to the module body 80 with bolts 285 (FIG. 21).

To the periphery of the module body 80, on the other hand, there are axially attached structural beams, which are equipped at a predetermined pitch with working sockets 286. Each working socket 286 is a socket for fixing a jig such as a working bed or the like to be carried, when the worker maintains and inspects the periphery of the module body 80 outside of the space station, by inserting thereinto the fixing tool on the jig. The working robot of this ninth embodiment fixes its own position or moves by utilizing the projections such as the working sockets 286 or the heads of the bolts 285. Moreover, this ninth embodiment is characterized by a function to remove the foot itself of the robot by itself or by a remote manipulation when the foot is troubled and cannot be removed from the bolts or the like, as will be described in detail.

In FIG. 18, numeral 201 designates a body which is equipped at the four corners of its lower face with four multifunctional arms 210, 211, 212 and 213. The multifunctional arm 210 is connected at joints 210a, 210b and 210c so that it can turn freely in three-dimensional directions. Likewise, the multifunctional arm 211 is connected at joints 211a, 211b and 211c; the multifunctional arm 212 is connected at joints 212a, 212b and 212c; and the multifunctional arm 213 is connected at joints 213a, 213b and 213c, so that the working robot is enabled to move freely by extending/contracting the four arms 210, 211, 212 and 213. Here, the multifunctional arms have been explained in FIG. 18 by an example of four arms but may be two, three, or more than four.

To each of the joints 210c, 211c, 212c and 213c of the individual arms 210, 211, 212 and 213, there is connected a manipulation tool 202. To the side face of the manipulation tool 202, there are attached a camera 203 and a light 204. The image of the camera 203 is retrieved by lighting the light 204 by the not-shown control unit, and its data are processed thereby to monitor the situations and to confirm the position. The manipulation tool 202 is equipped with either an adapter for gripping the working socket 286 or for gripping the head of each of the bolts at the four corners of the M/D shield 281, or an adapter for removing the bolts and fixing the arms.

Next, the manipulation tool 202 will be described in detail with reference to FIGS. 19(a) and (b). In FIGS. 19 (a) and (b), (a) shows the manipulation tool 202 of each of the multifunctional arms 210 to 213, and (b) is a view taken in the direction of arrows A—A of (a). In the manipulation tool 202, as shown in (a) and (b), there is disposed at the center a piston adapter 223, which can be inserted, when protruded, into the T-handle socket 282 of the M/D shield 281. On the other hand, the piston adapter 223 is surrounded by a TV camera 220, a light 221, a working socket gripping adapter 222, an insulator removing adapter 224 and an unbolting driver 225.

The light 221 and the TV camera 220 are controlled by the not-shown control unit so that the light 221 is lit to catch the image of the surface of a structure with the TV camera 220. The adapter 224 removes the insulator which is laid below the M/D shield 281, and the driver 225 removes the bolts from the four corners of the M/D shield 281.

FIGS. 20(a) and (b) show the characteristic portion of the ninth embodiment of the invention, that is, the attached portion of a multifunctional arm to the body of the working robot, as has been described hereinbefore, and (a) is a sectional view, and (b) is a sectional view taken in the direction of arrows B—B of (a). For convenience of the description, there is shown an example of only the multifunctional arm 212. At the joint of the multifunctional arm 212, as shown, an arm attaching pin 212d is inserted into a hole 201a of the body 201, and a spring 233 is sandwiched between the arm attaching pin 212d and the hole 201a. In the two sides of the arm attaching pin 212d, on the other hand, there are notches 232a and 232b opposed to each other.

In the body 201 on the two sides of the two notches 232a and 232b of the arm attaching pin 212d, there are formed cylinders 230 and 231, pistons 230a and 231a of which are inserted, when extended, into the notches 232a and 232b of the arm attaching pin 212d and disengaged, when retracted, from the notches 232a and 232b to release the restriction of the arm attaching pin 212d, so that the multifunctional arm 212 can be easily removed from the body 201 by the elastic force of the spring 233.

Here, in place of the mentioned cylinders/pistons, a linear motor, an ultrasonic motor, a screw motor, a spring mechanism, a rack/pinion mechanism, a hydraulic piston, a magic hand type mechanical extending/contracting mechanism and push-out mechanism, etc. may be employed.

FIG. 21 shows a working robot of a type different from that of the working robot shown in FIG. 18. The structure different from that of FIG. 18 resides in that the body 201 is provided over its upper face with additional working multifunctional arms 215 and 216, but the remaining constructions are similar to those of the working robot of FIG. 18 and adopt likewise the structure of FIG. 20. Because of the multifunctional arms 215 and 216 in addition to those of FIG. 18, the working robot is enlarged in its working range to have more functions. Here, this embodiment has been described with the two multifunctional arms over the upper surface of the body and the four multifunctional arms below the lower face. It is, however, quite natural that the number of arms should not be limited thereto, but may be any number.

Figure 19A:
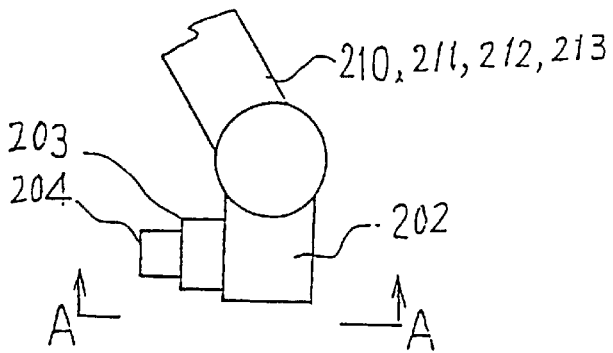
FIGS. 19(a) and (b) show the leading end of the multi-functional arm of the working robot shown in FIG. 18, and (a) is a construction diagram of a manipulation tool, and (b) is a view taken in the direction of arrows A—A of (a).
Figure 19B:
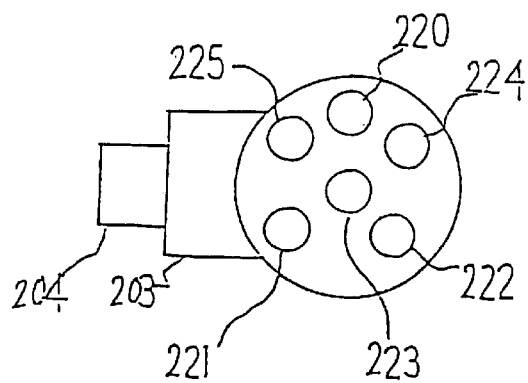

According to the working robot of the ninth embodiment thus far described, the working socket gripping adapter 222 (FIGS. 19(a) and (b)) of the manipulation tool 202 is fixed in the working socket 286 of the M/D shield 281 by the two multifunctional arms 212 and 213, although the detailed status view is omitted. Moreover, the M/D shield 281 to be replaced is fixed by inserting the manipulation tool 202 of the multifunctional arm 210 into the T-handle socket 282 of the M/D shield 281, and the M/D shield 281 to be replaced is lifted with the multifunctional arm 210 by removing the bolts 286 at the four corners by the manipulation tool 202 of the other multifunctional arm 211. In this state, the multifunctional arms 212 and 213 grip the heads of the working sockets 286 of the M/D shield 281 and are extended/contracted to move over the M/D shield 281. In the working robot shown in FIG. 21, on the other hand, the multifunctional arms 215 and 216 can be exploited to replace the M/D shield, as well, to thereby perform more precise and speedy works.

When the M/D shield 281 is to be attached, the bolts 285 are fastened by reversing the actions reversed from the aforementioned ones. Thus, it is possible without any man power in space to replace the M/D shield 281 of the house module or to examine the peripheral structure precisely.

Figure 22:
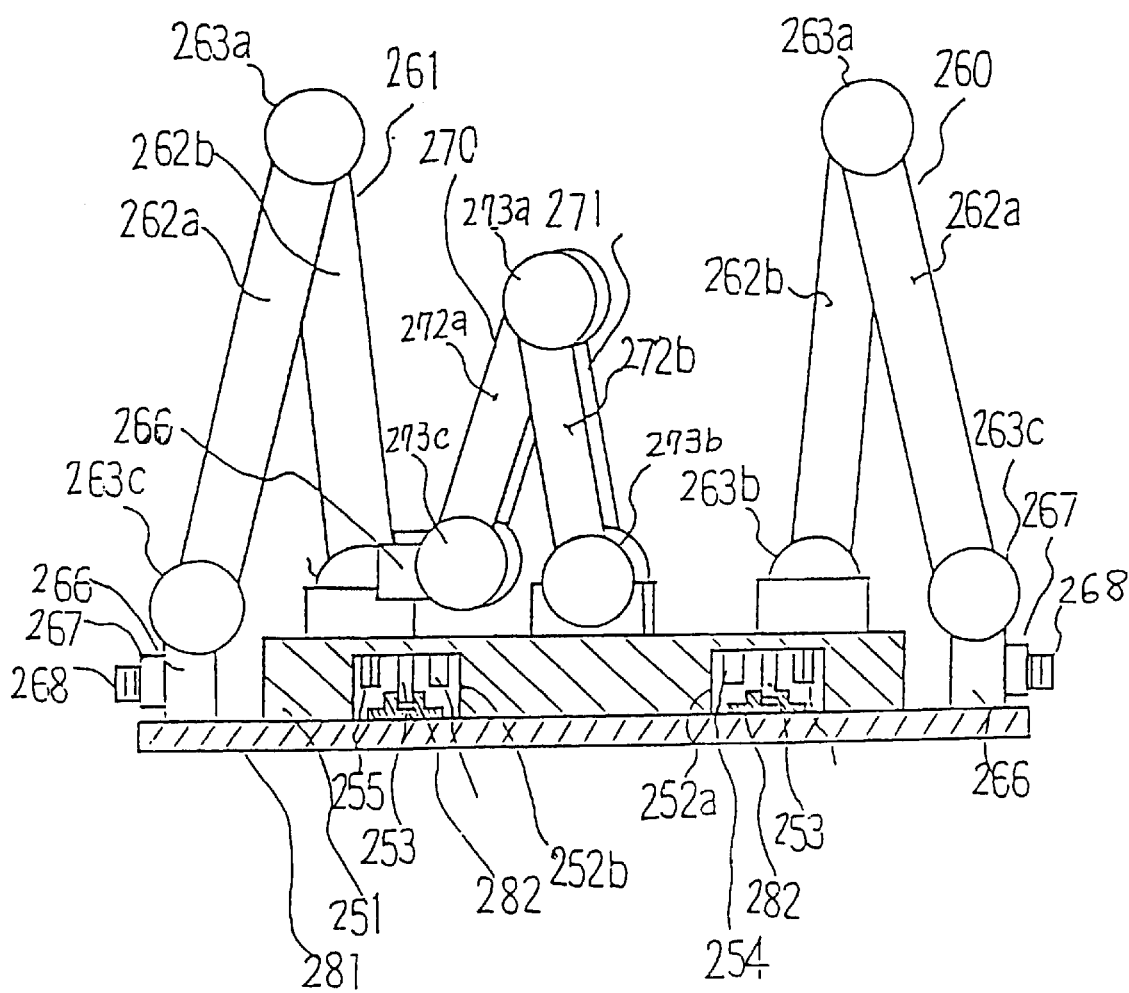
FIG. 22 is a perspective view of the robot of still another type and shows the of the working robot according to the ninth embodiment of the invention.

FIG. 22 is a construction diagram of a robot of a type different from that of the working robot according to the ninth embodiment of the invention. This robot has two multifunctional arms and two moving arms and is utilized in the manned module in the space station.

In FIG. 22, numeral 281 designates the M/D shield which is equipped at two portions with the T-handle sockets 282, which are utilized by the working robot so that the working robot is enabled to fix its own position and to move with the T-handle sockets 282, as will be described in detail.

In FIG. 22, numeral 251 designates a body which is provided with two openings 252a and 252b in its lower face. These openings 252a and 252b are sized to match the T-handle sockets 282 mounted in the M/D shield 281, as located at rather arbitrary positions, so that their spacing may correspond to the arbitrary spacing of the T-handle sockets 282. On the upper or side faces of the body 1 having the openings 252a and 252b, there are individually fixed moving arms 260 and 261.

In the openings 252a and 252b of the body 251, there are individually disposed piston adapters 253, each of which extends vertically through the moving arm on the upper face so that it engages, when stretched, with the T-handle socket 282 of the M/D shield 281 and leaves the same when retracted. In each of the openings 252a and 252b, on the other hand, there are disposed a camera 254 and a light 255 for confirming the adapter shape. All of these components 253, 254 and 255 are wired with and remotely controlled by the not-shown control unit disposed in the robot or the separate module.

On the upper face of the body 251, there are longitudinally fixed the two moving arms 260 and 261. For the individual moving arms 260 and 261, two arms 262a and 262b are jointed at joints 263a and are fixed at joints 263b to the body 251, and manipulation tools 266 are connected at joints 263c to the other ends of the arms 262a. To the side face of each manipulation tool 266, there are attached a camera 267, as made of an electric wave or infrared sensor, a TV camera or a laser scanning sensor, and a light 268. The image of the camera 267 is retrieved, if necessary, by the not-shown control unit to recognize the shape by performing the edge detection or the template matching of an object to be gripped, and to move and work while confirming a command by collating with map data packaged in its own CPU. The manipulation tool 266 is equipped with either an adapter for gripping the heads of bolts at the four corners of the M/D shield 281 or a screw adapter for removing the bolts and fixing the arm.

At the central portion of the body 251, there are fixed in parallel on the two sides two multifunctional arms 270 and 271. For these multifunctional arms 270 and 271, as well, two arms 272a and 272b are jointed at joints 273a and are fixed at joints 273b to the body 251, and manipulation tools 266 are mounted at joints 273c on the other ends of the arms 272a and 272b. The manipulation tools 266 have the same construction as that 202 shown in FIG. 19.

According to the working robot thus far described, the piston adapter 253 of the body 251 is fixed in the T-handle socket 282 of the M/D shield 281; the M/D shield 281 to be replaced is fixed by inserting the manipulation tool 266 of the multifunctional arm 270 into the T-handle socket 282; the bolts 285 at the four corners are removed by the manipulation tool 266 of the other multifunctional arm 271; and the M/D shield 281 to be replaced is lifted by the multifunctional arm 270. In this state, the moving arms 260 and 261 are extended/contracted to move over the M/D shield 281 by gripping the bolt holds of the M/D shield 281. When the M/D shield 281 is to be attached, the bolts 285 are fastened by actions reversed from the aforementioned ones. Thus, it is possible in space, without any man power, to replace the M/D shield of the house module or to inspect the surrounding structure precisely.

In the working robot of the type shown in FIG. 22, the structures for attaching the multifunctional arms 271 and 272 on the body 251 are identical to those shown in FIGS. 20(a) and (b) and will be omitted from FIG. 22. Although the detailed description is omitted, the arms can be fixedly supported and removed by extending/contracting the pistons 230a and 231a of the cylinders 230 and 231, as in the working robots shown in FIGS. 18 and 21.

Next, the characteristics of the ninth embodiment of the invention to be applied to the working robot of the type described with reference to FIGS. 18, 21 and 22 will be described with reference to FIGS. 20(a) and (b) and 23(a) –(d). The description on FIGS. 23(a)–(d) will be made in connection with the example of the working robot shown in FIG. 18, but can be applied to the working robots shown in FIGS. 21 and 22. However, the actions per se are identical so that their description will be omitted.

FIGS. 23(a)–(d) show at (a) the state in which the working robot moves over the M/D shield 281 by fixing the manipulation tools 202 of the multifunctional arms 210 to 213 in the working sockets 286 at the four corners of the M/D shield 281. At (b), there is shown the case in which the multifunctional arm 212 is so troubled during the movement that its manipulation tool 202 is caught and cannot be removed. In this case, the attached portion of the multifunctional arm 212 on the body 201 is removed, as shown in FIGS. 20(a) and (b). In response to the command from the not-shown control unit, reverting to FIG. 20, the pistons 230a and 231a of the cylinders 230 and 231 are retracted and disengaged from the notches 232a and 232b of the arm attaching pin 212d so that the multifunctional arm 212 is brought into the removable free state. Then, the multifunctional arm 212 is removed from the body 201 by the elastic force of the push-out mechanism 233, such as the spring, hydraulic, pneumatic, linear motor, screw motor or ultrasonic motor.

In the aforementioned state, the multifunctional arms 211 and 213 are removed from the working sockets 286 and are transversely moved to over the sideway M/D shield 281. As shown at (c), the multifunctional arms 211 and 213 are operated to grip the working sockets 286 of the sideway M/D shield 281 to thereby move the body 201 transversely. In the troubled multifunctional arm 212 in this state, the unremovably troubled manipulation tool 202 is fixed as it is, and the arm attaching pin 212d at its leading end is disengaged from the body 201 and left as it is.

In the state at (d), the working robot having completed its transverse movement moves again in the advancing direction by manipulating its remaining three multifunctional arms 210, 211 and 213 while cutting away and leaving the troubled multifunctional arm 212 as it is. Even if any of the multifunctional arms is troubled, therefore, it is separated so that the working robot is enabled to move safely by manipulating the remaining normal arms. Here, the working robots shown in FIGS. 21 and 22 are also enabled, although not shown, to run by cutting away the troubled arm in similar manipulations.

According to the ninth embodiment thus far described, if any of the multifunctional arms of the working robot is so troubled that its manipulation tool 202 becomes uncontrollable and cannot be removed from the working socket 286 of the M/D shield 281, the arm attaching pin 212d of the troubled multifunctional arm can be removed from the body 201 by the elastic force of the spring 233 by manipulating the pistons 230a and 231a of the cylinders 230 and 231. Thus, the body can be safely moved by the remaining multifunctional arms while leaving the troubled multifunctional arm as it is.

Figure 24A:
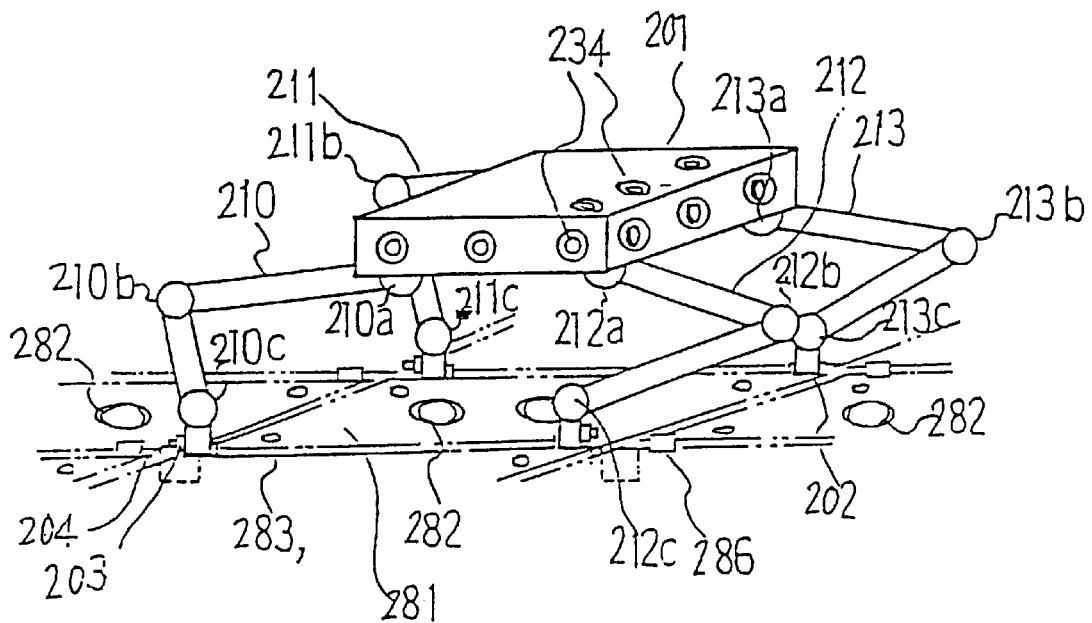
FIGS. 24(a) and (b) are perspective views showing the entire construction of a robot according to a tenth embodiment of the invention, and (a) and (b) show individual examples in which a visual sensor is applied to robots of different types.

FIGS. 24(a) and (b) are a construction diagram of a working robot according to a tenth embodiment of the invention, and (a) shows the working robot corresponding to FIG. 9, and (b) shows the robot which is provided, as corresponding to FIG. 21, with the multifunctional arms 215 and 216 on the upper face of the body. In these Figures, what is different from the ninth embodiment resides in that the robot body 201 is provided with visual sensors 234 on its outer surface, and the remaining constructions and actions are identical to those of the working robot of the ninth embodiment so that their description will be omitted. It is quite natural that the working robot shown in FIG. 22 is also provided, although not shown, with the visual sensors 234 on the surface of the body 251.

The visual sensors 234 are attached in a plurality on the peripheral side faces and the upper face or on the lower face, if necessary, of the robot body 201. The visual sensors are exemplified by the electronic wave type radars, the infrared sensors or the scanning sensors using the laser beam so that they may sense all the objects and troubles, as appearing longitudinally, transversely and vertically, when the working robot moves, and may transmit their signals to the not-shown control unit for the safety work.

FIGS. 25(a)–(d) show a working robot according to an eleventh embodiment of the invention, and (a) is a sectional view showing the manipulation end of a multifunctional arm, (b) is a sectional view taken in the direction of arrows C—C of (a), (c) is a sectional view showing a locked state by a piston, and (d) is a sectional view showing an unlocked state. This eleventh embodiment can be applied to the manipulation ends of all the arms of the working robots shown in FIGS. 9, 21 and 22, and the remaining constructions and actions of the robot are identical to those of the ninth embodiment.

With reference to FIGS. 25(a)–(d), the example of the multifunctional arm 212 will be representatively described for conveniences of description. As shown in FIGS. 25(a)–(d), the manipulation tool 202 of the multifunctional arm 212 is inserted into an adapter 236. From the circumference of the manipulation tool 202, there are protruded four pins 235 which enter to engage with grooves 235a of the adapter 236 thereby to support the adapter 236. The multifunctional arm 212 grips the working socket 286 of the M/D shield 281 through the adapter 236 and is supported on the working socket 286 by the piston adapter 223.

If the piston adapter 223 or the like becomes uncontrollable in the course of supporting the working socket 286 by the adapter 236 so that the multifunctional arm 212 cannot be disengaged from the working socket 286, the manipulation tool is turned in a direction S by the not-shown built-in motor, as shown at (b). In the state (b), the pins 235 engage with the grooves 235a, as shown at (c). As a result of the turn in the direction S, the pins 235 are allowed to move upward along pins 235b wider than the pins 23, so that the manipulation tool 202 can be easily removed from the adapter 236.

When a multifunctional arm of the working robot shown in FIGS. 18, 21 and 22 is troubled and disabled to leave the working socket 286 of the M/D shield 281, according to the working robot of the eleventh embodiment of the invention described above, in response to the command from the control unit, the manipulation tool 202 of the troubled multifunctional arm is turned in the direction S, and the pins 235 are moved from the inside of the grooves 235a to the grooves 235b and released from their restraints so that they are disengaged from the adapter 236. The working robot disengages only the manipulation tool 202 while leaving the adapter 236 so that it can be moved by manipulating the remaining multifunctional arms and their leading adapters 236.

Figure 26:
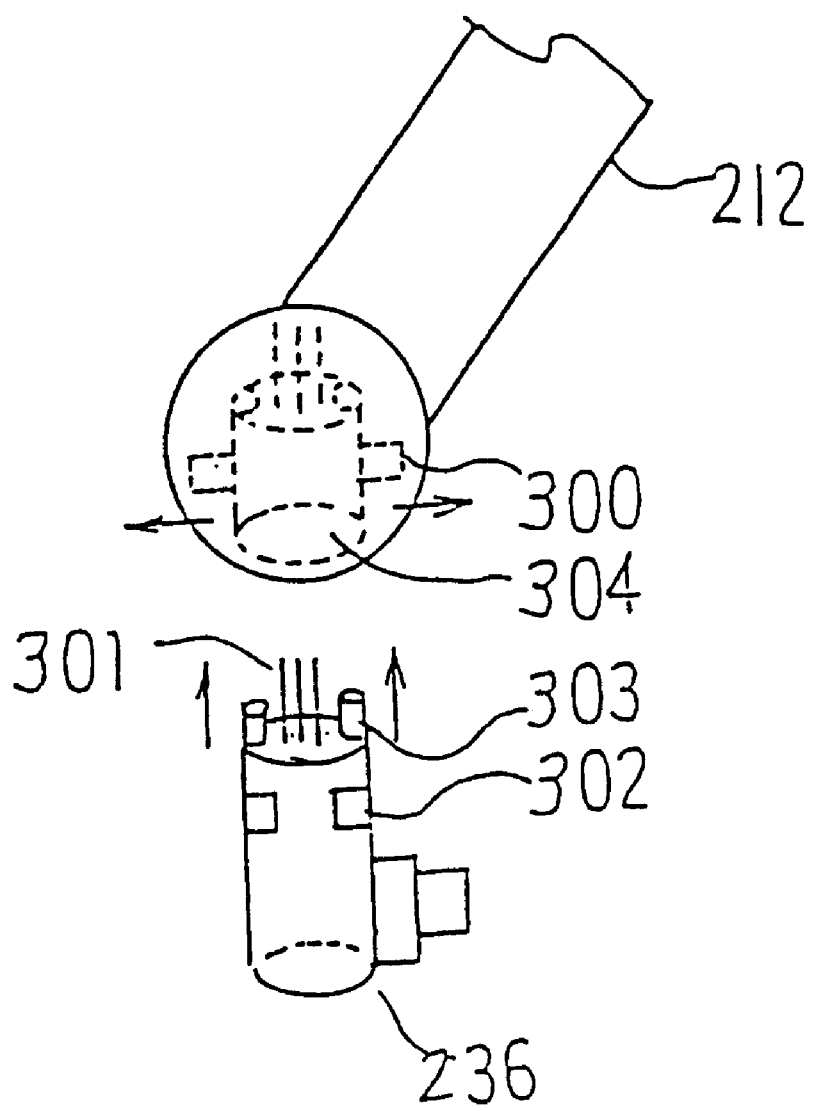
FIG. 26 is a front elevation showing a modification of the eleventh embodiment of the invention.

FIG. 26 shows a modification of this eleventh embodiment, in which the multifunctional arm 212 is provided with a hole 304 at its leading end and with two ratchets 300 on its two sides. The adapter 236 is provided at its leading end with parting devices 303, which are pushed and disengaged outward when pushed by the spring buried in the arm 212, hydraulically or pressure piston or electromagnetic force. When the adapter 236 is mounted, the ratchets 300 come into ratchet ports 302 to support the adapter 236. When the adapter 236 is removed, the ratchets 300 can be retracted to push the parting device 303 thereby to release the adapter 236.

Here, the mechanism to be employed for pushing the parting device 303 should not be limited to the aforementioned one, but can be exemplified by a linear motor, an ultrasonic motor, a screw motor, a spring mechanism, a rack/pinion mechanism or a magic hand parting mechanism.

Figure 27A:
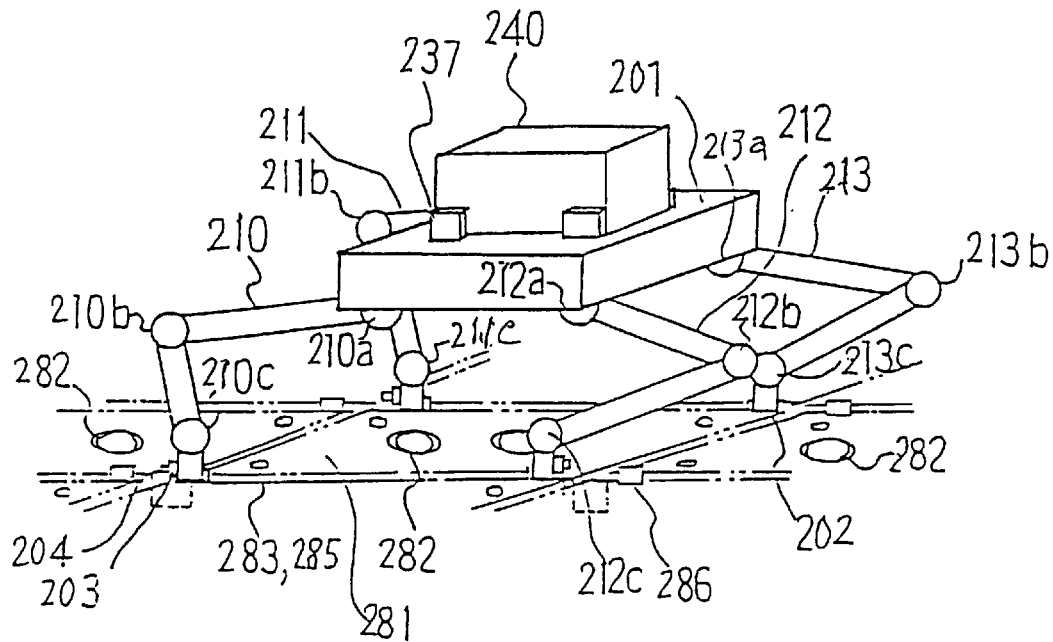
FIGS. 27(a) and (b) show a working robot according to a twelfth embodiment of the invention, and (a) and (b) are perspective views of the states in which a pay-load is mounted on robots of different types.
Figure 27B:
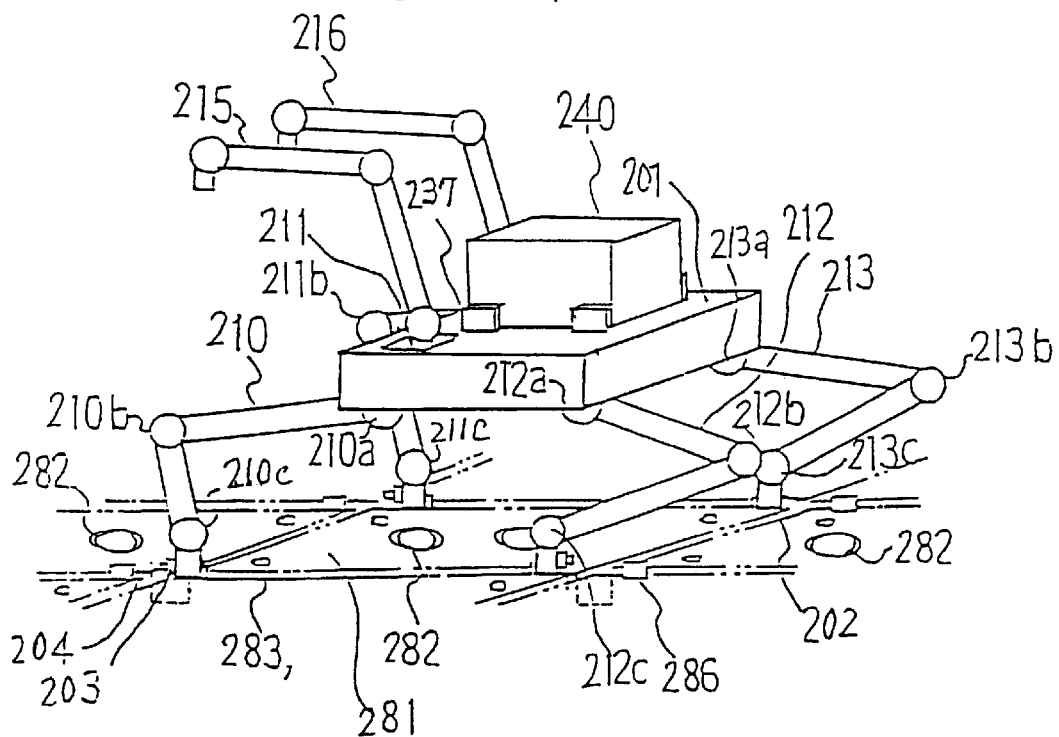

FIGS. 27(a) and (b) show a working robot according to a twelfth embodiment of the invention, and (a) is a construction diagram of the working robot corresponding to that of FIG. 18, and (b) is a construction diagram corresponding to that of FIG. 21. This working robot can mount a pay-load 240 on the upper face of the body 201. The remaining constructions and actions are identical to those of the working robot of the ninth embodiment shown in FIG. 21 so that their description will be omitted. Although not shown, however, the working robot shown in FIG. 22 can also be given a structure capable of mounting the pay-load 240.

On the body 201, as shown in FIGS. 27(a) and (b), there is mounted the pay-load 240 which is composed of boxes for various devices, cases for support tools for supporting the outboard activities of crews, and experiment modules. This pay-load 240 is supported at its two right and left sides by two support hands 237. These support hands 237 support and fix the pay-load 240 by the opposed right and left ones.

Figure 28A:
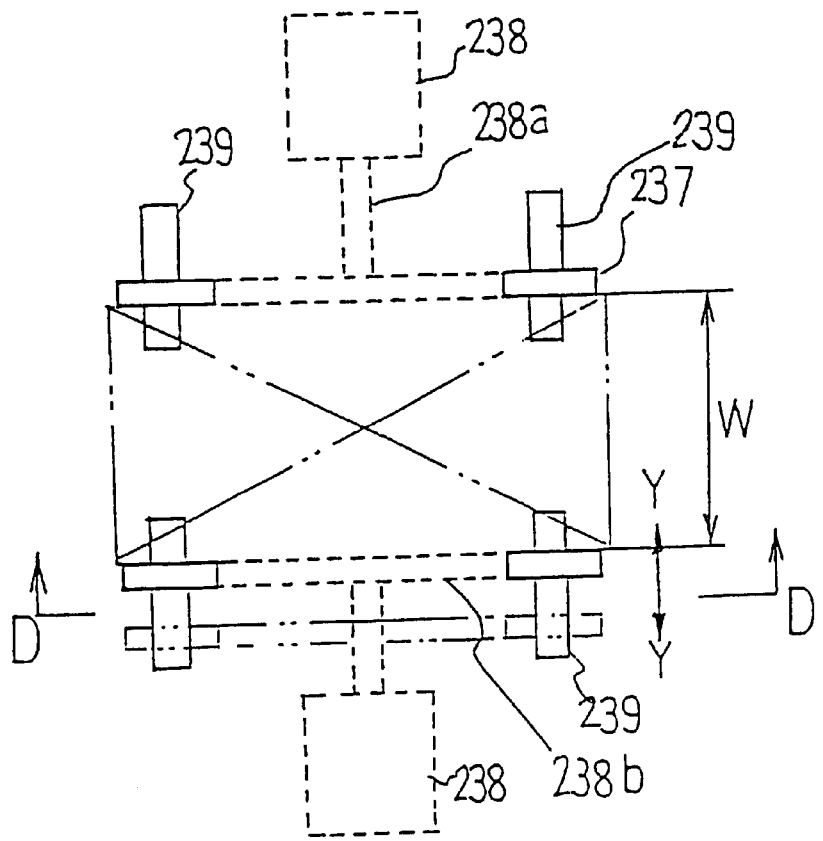
FIGS. 28(a) and (b) shows a structure of a support hand of the working robot shown in FIG. 28, and (a) is a top plan view, and (b) is a view taken in the direction of arrows D—D of (a).
Figure 28B:
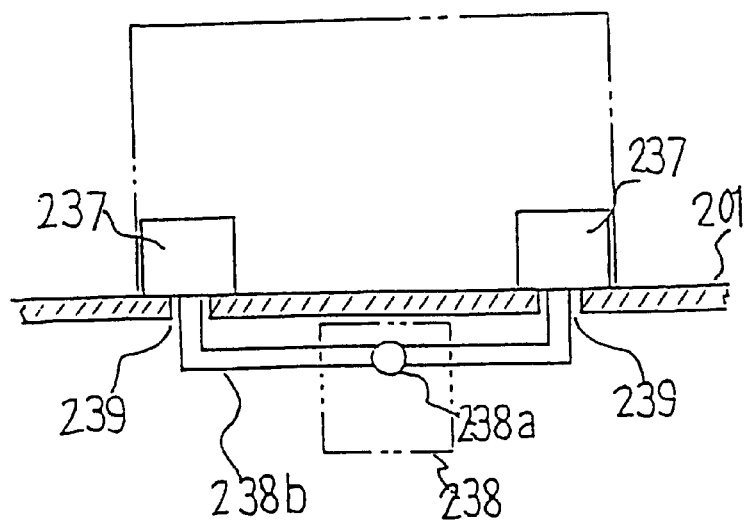

FIGS. 28(a) and (b) show the support of the pay-load 240 by the support hands 237, as described above, and (a) is a top plan view, and (b) is a diagram taken in the direction of arrows D—D of (a). As shown, the pay-load 240 is pushed and supported by the two support hands 237. Numeral 238 designates cylinders which are disposed on the two sides to confront each other and which have shafts 238a connected to connection bars 238b. These connection bars 238b fix the support hands on their two ends. Numeral 239 designates guide grooves which are cut away in the upper face of the body 201 to allow the support hands 237 to move in a direction Y.

The pay-load 240 has box shapes of various width sizes W, according to which the paired support hands on the confronting sides are enabled by extending/contracting the shafts 238a of the cylinders 238 to move in the direction Y into abutment against the side faces of the pay-load 240 to thereby support and fix the pay-load 240 by pushing it from the two sides. When the pay-load 240 is to be mounted on the body 201, the cylinders 238 are contracted to widen the space of the support hands 237 to the maximum so that the pay-load 240 is gripped and mounted by the multifunctional arms of the robot. After this mounting, the cylinders 238 are controlled by the not-shown control unit to extend the shafts 238a of the cylinders 238 so that the pay-load 240 is supported by pushing the support hands 237 on the side faces of the pay-load 240.

Alternatively, the pay-load 240 can also be supported by cutting straight grooves in the side and by fitting the adapters in the grooves to fix the pay-load 240 through the adapters. The adapters and the body in this case may employ attraction means such as electromagnets.

According to the working robot of the twelfth embodiment thus far described, the pay-load 240 is mounted on the upper face of the body 201 by the multifunctional arms of the working robot shown in FIGS. 18, 21 and 22 and is supported and fixed with the support hands 237 by manipulating the cylinders 238, so that the workability around the orbital device structure can be drastically improved.

FIGS. 29(a)–(c) show an arm portion of a working robot according to a thirteenth embodiment of the invention, and (a) is a side elevation of the multifunctional arm, (b) is a diagram taken in the direction of arrows E—E of (a), and (c) is a top plan view of (b). For conveniences of description, the arm portion is exemplified by one corresponding to the multifunctional arm 212 of the working robot of FIG. 18. However, it is quite natural that the thirteenth embodiment can also be applied to the working robots of the types shown in FIGS. 21 and 22.

In FIGS. 29(a)–(c), a multifunctional arm 320 is composed of an upper arm 320a and its inner cylinder 320b, and a lower arm 320c and its inner cylinder 320d. The arm 320a and its inner cylinder 320b can be freely extended/contracted in directions Z2 with respect to each other, and the arm 320c and its inner cylinder 320d can be freely extended/contracted in directions Z3 with respect to each other. In the body 201, there is formed an attaching hole 201c, into which there is inserted an arm attaching pin 241. On the two sides of the hole 201c, there are protruded guides 201d which engage with grooves 241a in the arm attaching pin 241 to allow the arm attaching pin 241 to move in directions Z1. Over the arm attaching pin 241, on the other hand, there is disposed a roller 242 for smoothing the movements in the directions Z1.

In one side face of the arm attaching pin 241, there is arranged a cylinder 243, to which a shaft 243a is connected, so that the cylinder 243 can move in the directions Z1 as the shaft 243a is extended/contracted. In the multifunctional arm 320, therefore, the arm attaching pin 241 can adjust its position in the directions Z1, and the arm 320a and its inner cylinder 320b can be freely extended/contracted in the directions Z2 whereas the arm 320c and its inner cylinder 320d can be freely extended/contracted in the directions Z3.

Although not shown, on the other hand, the arm attaching pin 241 can be vertically protruded to adjust its length. In this case, the arm can be provided with two or three vertical ratchet grooves so that the vertical length of the arm attaching pin 241 can be adjusted by inserting and fixing the ratchets in the grooves.

Figure 30:
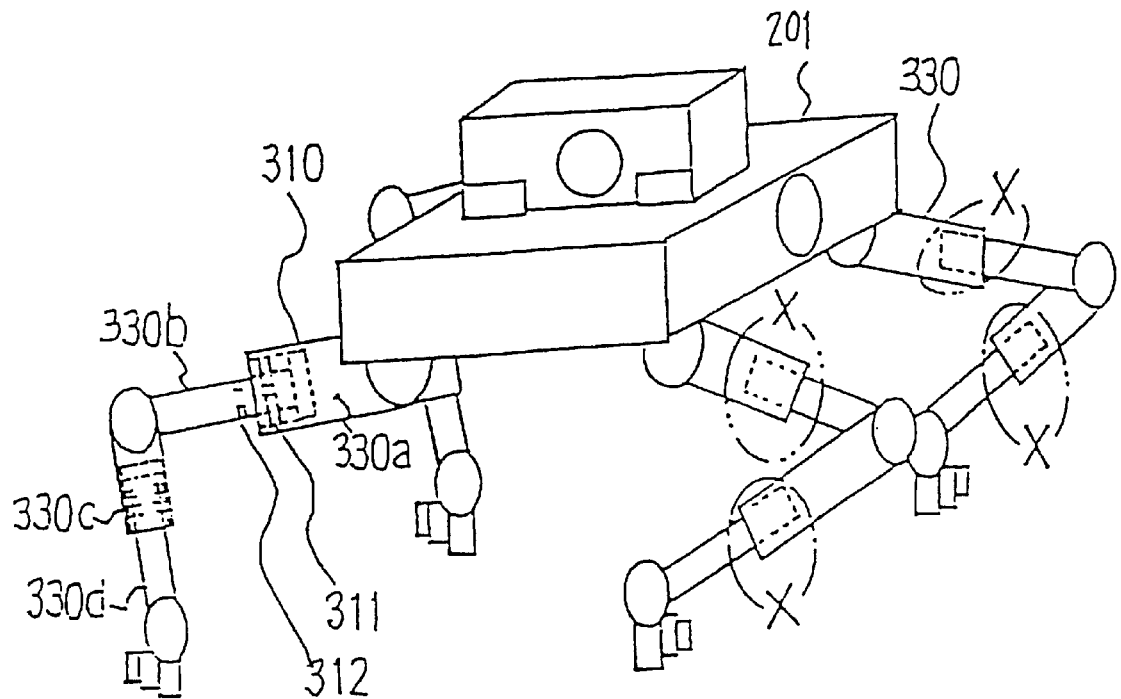
FIG. 30 is a perspective view showing a modification of the thirteenth embodiment of the invention.

FIG. 30 shows a modification of the thirteenth embodiment of the invention. A multifunctional arm 330 is composed of arm members 330a, 330b, 330c and 330d, of which the arm member 330a is equipped with an ultrasonic motor type push-out device 310 so that a ratchet 311 enters a ratchet port 312 of the arm member 330b to support the arm member 330b.

Likewise, the arm member 330c is also equipped with the ultrasonic push-out device 310 and the ratchet 311 so that the ratchet 311 enters the ratchet port 312 of the arm member 330d to support the arm member 330d with the arm member 330c.

With the ratchet being retracted, the arm thus constructed can be extended/contracted by the ultrasonic push-out device 310 and can be fixed by inserting the ratchet 311 into the ratchet port 312. These two telescopic mechanisms X are disposed at each of the arms.

Here, the push-out device 310 should not be limited to the aforementioned one, but can be exemplified by a linear motor, a screw motor, a spring force, a rack/pinion mechanism, a hydraulic/pneumatic piston or a magic hand type push-out mechanism.

According to the thirteenth embodiment, the working robots can be moved and extended/contracted by controlling the cylinders 243, 244 and 245 individually with the not-shown control unit so that the multifunctional arm 320 can be positioned in the directions Z1 and extended/contracted in the directions Z2 and Z3 in accordance with the necessity for the work. According to the environments surrounding the orbital device structure, the work can be done by setting the positions and lengths of the multifunctional arms and the moving arms properly for the places where the M/D shields are wide or narrow.

Figure 31:
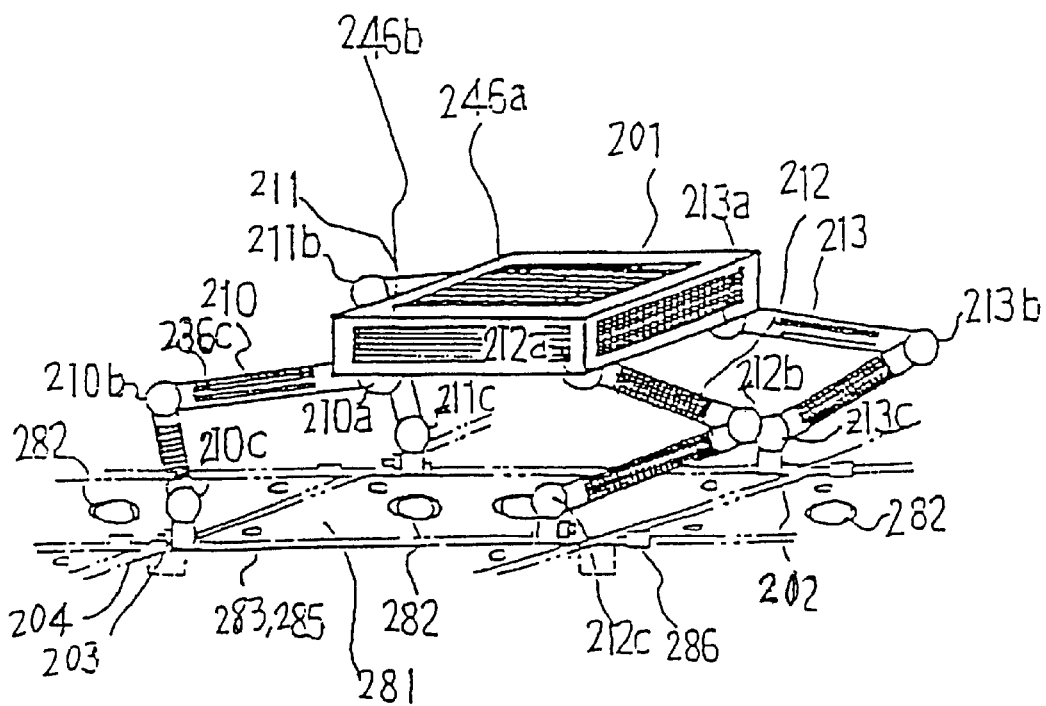
FIG. 31 is a perspective view of a working robot according to a fourteenth embodiment of the invention.

FIG. 31 is a construction diagram of a working robot according to a fourteenth embodiment of the invention, in which solar cells are attached to the working robot of the type shown in FIG. 18. The remaining constructions and actions are identical to those of the ninth embodiment shown in FIG. 18. It is quite natural that the fourteenth embodiment can also be applied to not only the working robot shown in FIG. 18, but also the working robot shown in FIGS. 21 and 22.

In FIG. 31, the solar cells are laid on the upper face 246a and all the side faces 246b of the body 201 and to the peripheries of the legs 236c of the multifunctional arms 210 to 213, so that they can receive the solar energy in all directions and can be charged. In this fourteenth embodiment having such solar cells, stable electric power can be generated as the power source for manipulating the working robot. Even if the individual portions are separated, on the other hand, they can communicate with one another to change their positions.

Figure 32:
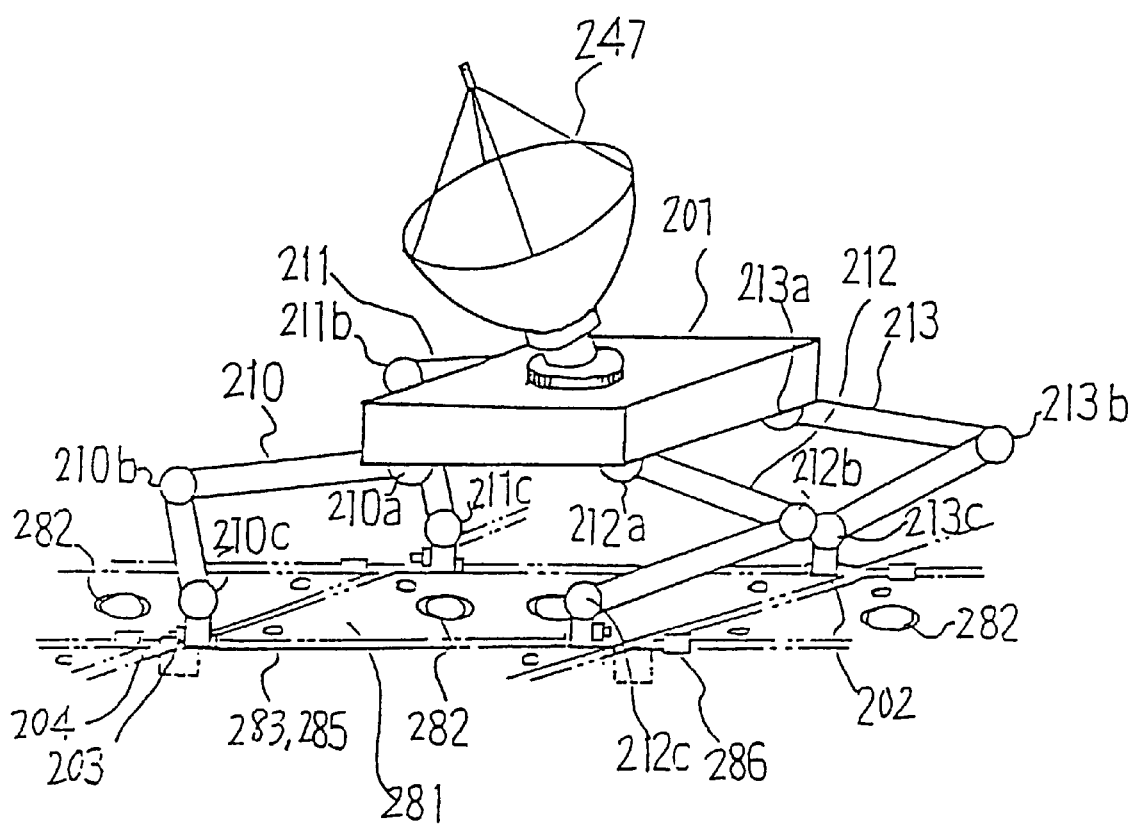
FIG. 32 is a perspective view of a working robot according to a fifteenth embodiment of the invention.

FIG. 32 is a construction diagram of a working robot according to a fifteenth embodiment of the invention, and shows an example in which an antenna 247 is mounted on the working robot of the type shown in FIG. 18. The remaining constructions are identical to those of the embodiment 9 shown in FIG. 18. The fifteenth embodiment can be applied not only to the working robot of FIG. 18, but also to the working robot shown in FIGS. 21 and 22.

The antenna 247 is mounted on the upper face of the body 201 so that it can communicate with the space station through cables or wireless separate small antennas to exchange the data. In response to the signals from the space station, the built-in control unit can be controlled to perform the remote controls from the space station. There can be mounted a large-sized antenna for data communications at a long distance. This antenna can be tracked by moving the legs of the robot body.

Figure 33A:
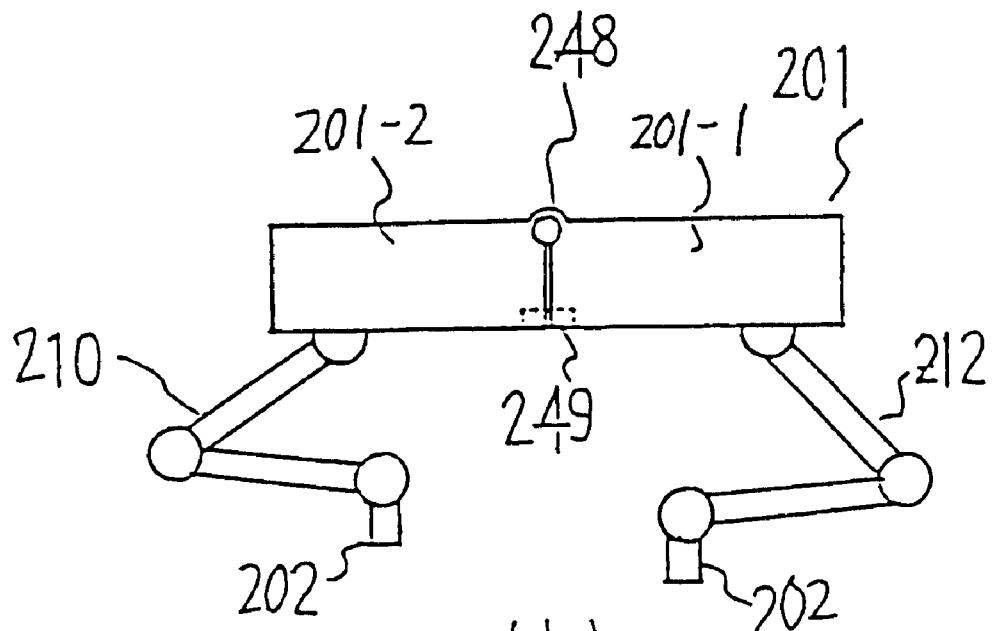
FIGS. 33(a) and (b) show the exterior of a working robot according to a sixteenth embodiment of the invention, and (a) is a front elevation, and (b) is a front elevation showing the state in which the body is folded.
Figure 33B:
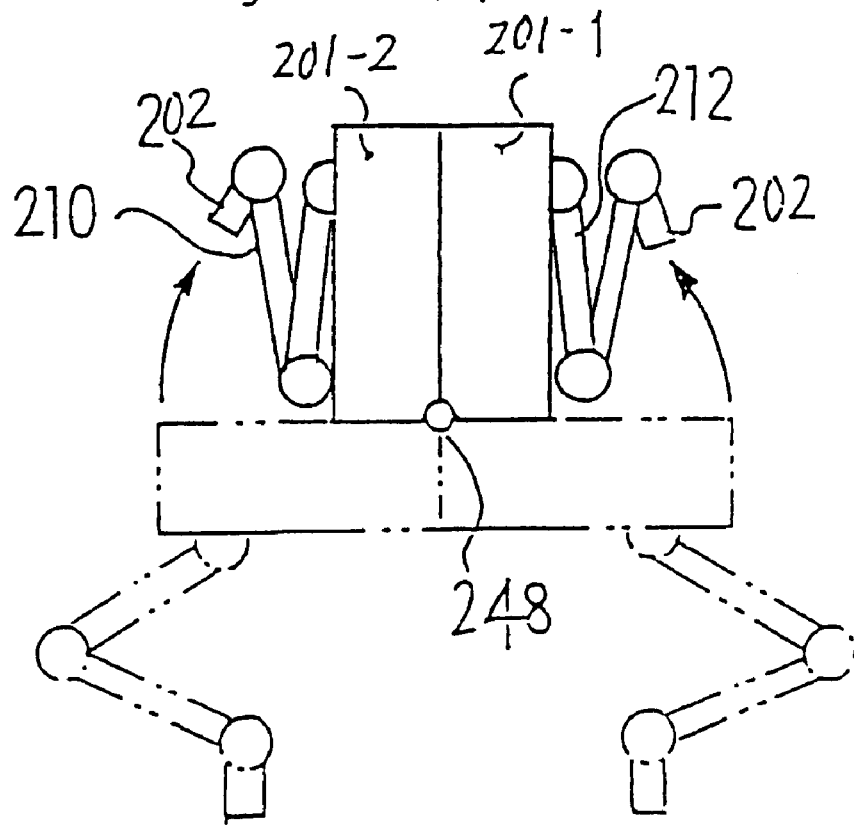

FIGS. 33(a) and (b) show a working robot according to a sixteenth embodiment of the invention, and (a) is a front elevation of the robot body, and (b) is a front elevation showing the state in which the robot is folded. At (a) and (b), the body 201 is divided into body halves 201-1 and 201-2, which are jointed by a hinge 248. In an ordinary use, the body halves 201-1 and 201-2 are horizontally fixed by a lock 249 so that they function as the body 201. At the time of passing through a narrow passage such as the air lock in the space station, however, the body halves 201-1 and 201-2 can be turned upward from each other on the hinge 248 and folded, as shown at (b), and the multifunctional arms can also be folded so that the working robot can be made compact in its entirety. In this state, the working robot can be delivered into and out of the space station through narrow place. On the other hand, the working robot is so compact that it can pass through the narrow place. Here, the folding has been described as the halving into two, but may naturally be more than two.

Figure 24B:
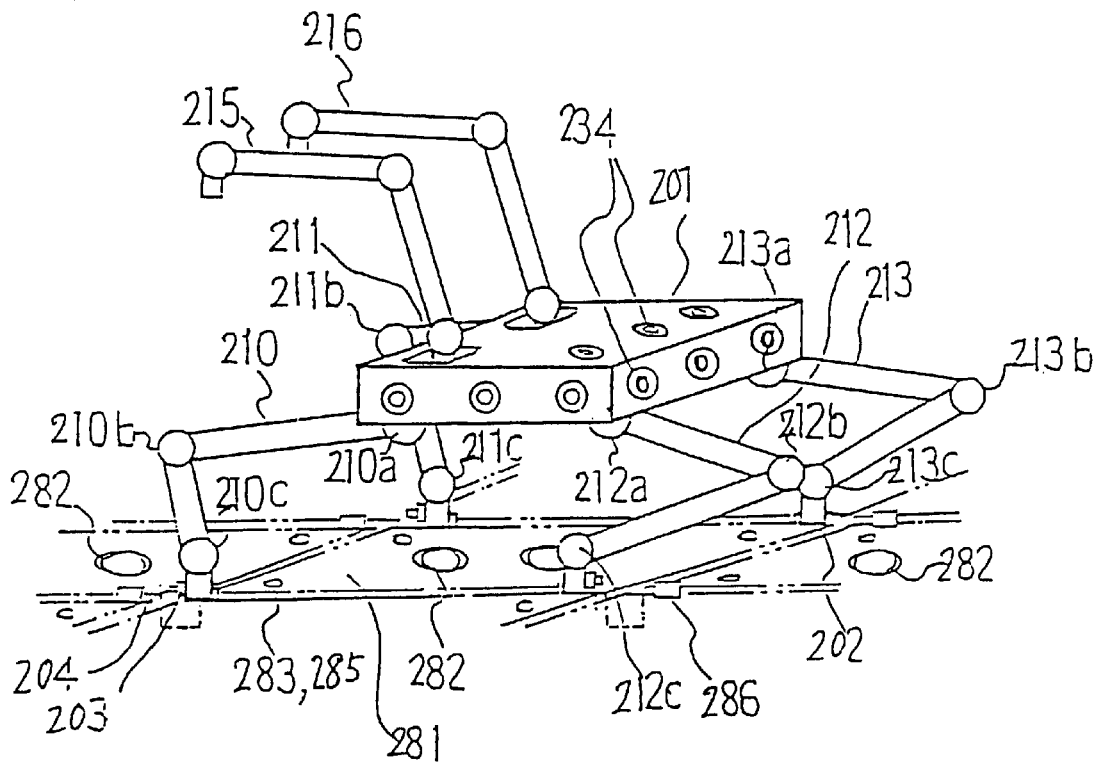
Figure 25:
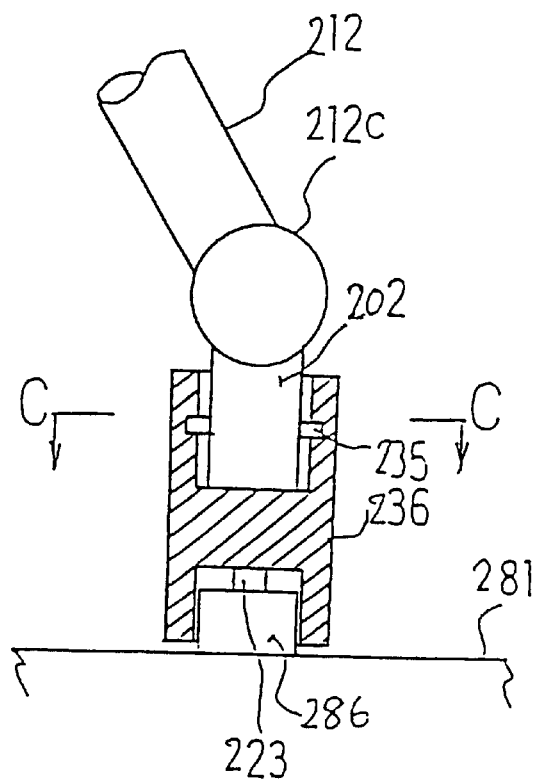
FIGS. 25(a)–(d) show a manipulation end of a working robot according to an embodiment of the invention, and (a) is a sectional view, (b) is a sectional view C—C of (a), (c) is a sectional view of a locked state, and (d) is a sectional view in an unlocked state.
Figure 25:
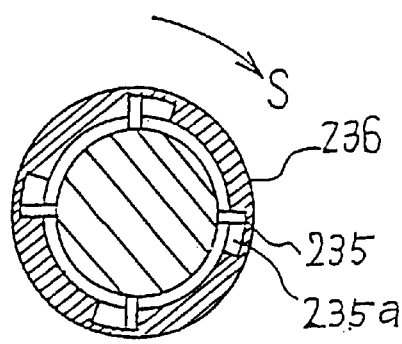
Figure 25:
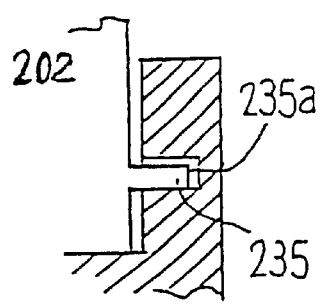
Figure 25:
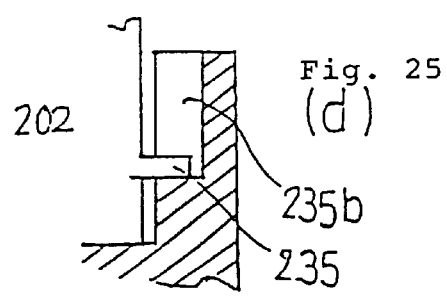

Here will be described the remaining characteristics of the working robot, although not shown. The working robot is provided with equipment for fixing the robot body on the module body of the space station by means of piano wires or ropes. The working robot may be additionally equipped at its body 201 or 251 with a camera, a light and so on in addition to the sensors 234 shown in FIG. 24. On the other hand, the working robot is given on its body surface a structure shielding the M/D shields for retaining safety so as to prevent the surface from being damaged by the high-speed collisions of obstacles flying in space.

Here will be described the control unit for making the various controls of the working robots thus far described according to the ninth to sixteenth embodiments. The control unit is not shown, but may be exemplified by the remote control, as effected with or without wires from the space station, or the mobile type which is built in the body 201 or 251. In the mobile type, the control unit has a storage unit which is stored with data such as the running routes, the positions for fixing the body 201 by the manipulation tools 202 of the multifunctional arms, and the destination for the body to reach, so that it controls the movements on the basis of the data.

As an additional function, the control unit may be given an artificial function and installed with programs for causing the movements and the manipulations of the multifunctional arms by selecting the best condition for the surrounding situations not to harm the men and or damage the structures. If any system goes out of order and causes trouble so that the working robot does not function according to the command signals of the control unit, on the other hand, the programs are interchanged with automatic return functions in response to the answer-back signals to return the working robot.

The control unit is further provided with automatic route changing programs. While the robot is being moved and manipulated in response to the commands of the control unit, according to the programs, an obstacle is detected, if any, with the visual sensors or the cameras and is avoided so that the optimum route may be changed for the robot. When the pay-load is mounted, moreover, the control unit is given functions to select the optimum arm, to determine the position and to manipulate the arm by inputting the physical characteristic data such as the weight and the center of gravity of the pay-load to calculate and determine where to mount the pay-load on the body, on the basis of those data.

Here, it is the best that all the ninth to sixteenth embodiments and the aforementioned individual functions of the control unit thus far described are incorporated into the working robot to exploit the robot for multiple purposes. In accordance with the applications and purposes of the working robot, however, it is also effective for the economical aspect that the necessary minimum one or ones of the functions of the ninth to sixteenth embodiments are selected and incorporated into the robot. It is quite natural that the invention can use those embodiments in any combination.

INDUSTRIAL APPLICABILITY

The working robot of the invention (1) is constructed to comprise a robot body and at least one arm device including a plurality of arm members jointed articulately at their end portions. The arm device is turnably attached at its one end to the robot body and having a manipulation tool connected to its other end, and the arm device can be extended/contracted. Thanks to the extensible structure of the arm device by the articulately movable connections of the arm members, the turnable attaching structure relative to the robot body, and the selection and use conforming to the objects of the manipulation tools connected to the arm device, the robot body can be reliably moved to a desired position, and the required various functions can be executed.

In the invention (2), the working robot comprises a robot body and at least one moving arm and one multifunctional arm including a plurality of arm members jointed articulately at their end portions and turnably attached at their one end to the upper face or the side face of the robot body and having a manipulation tool connected to their other end. In this basic invention, the robot body is moved either by gripping the attached member, as attached to the structure surface, such as the bolt heads for attaching the shield covering the surface, with the moving arm or by removing the bolts and screwing other bolts, and by extending/contracting the two arms. With this construction, the robot body can be supported by gripping or screwing/removing the heads of the bolts for attaching the shield on the structure in space, with the moving arm, and the body can be reliably moved by extending/contracting the two arms to move the grips of the bolts sequentially.

In the invention (3), the module can be lifted by the multifunctional arms with the body being fixed on the structure by the fixing members. In the invention (4), on the other hand, the manipulation tool is provided with the piston type adapter so that the fixing member, the manipulation tool and the structure, or the module, can be reliably fixed by bringing the adapter into engagement with the socket portion on the structure side. In the invention (2), therefore, the module can be easily lifted and moved for its replacement.

In the invention (8), on the other hand, the multifunctional arms are equipped at their manipulation tools with unbolting drivers. Therefore, the module attaching bolts can be removed by manipulating the drivers, and can also be fastened by the same. Therefore, the multifunctional arms are enabled to move by removing at first the bolts of the shield by the manipulation tool, subsequently by lifting and removing the shield and by holding the same.

In the invention (9), on the other hand, the multifunctional arms of the invention (2) can grip the hand rails attached to the surface of the house module in the space. As a result, the moving range is made wider in addition to the movement caused by gripping the bolt heads.

In the invention (10), on the other hand, the working robot comprises a robot body and at least one moving arm and one multifunctional arm including a plurality of arm members articulately jointed at their end portions and turnably attached at their one end to the upper face or the side face of the robot body and having a manipulation tool connected to their other end. The lower face of the robot body and the moving arm are equipped at their manipulation tools with drills or bits to be inserted and fixed in the ground, and the moving arm is enabled to move the body by extending/contracting itself with the robot body being unfixed on the ground and by screwing the drills or bits into the ground, then to fix the body on the ground by the drills or bits, and to remove the drills or bits of the moving arm from the ground after the body was fixed. With this construction, the robot body is enabled to move over the ground of the satellite or the like by inserting the drills or bits of the manipulation tool of the moving arm into the ground to fix (screw) and remove (or unscrew) the same, and by extending/contracting the arm. When the robot body is to be fixed on the ground, on the other hand, the body can be reliably fixed by fixing their drills or bits in the ground.

In the invention (11), in line with the invention (10), the robot body can be moved easily and speedily over the ground by replacing the drills or bits at the manipulation tools of the moving arm by the wheel adapters.

In the invention (16) or (12), in line with the inventions (2) and (10), each manipulation tool of the multifunctional arm and the moving arm is equipped with a light and a camera so that the image from the camera can be retrieved in the control chamber or the like. In the invention (2), it is possible to observe the situations around the structure in space and to acquire the data by the data processing. In the invention (10), on the other hand, it is possible to observe the ground of the satellite.

In the invention (5), on the other hand, the working robot comprises the robot body, and at least one multifunctional arm including a plurality of arms jointed at their end portions and turnably attached at its one end to the lower face of the body and having a manipulation tool connected to its other end. Moreover, the multifunctional arms move the body by gripping the sockets or bolt heads protruding from the surface of the structure by the manipulation tools and by extending/contracting the arms to change the grips to other sockets or bolt heads. With this construction, the body can be reliably moved either by gripping the working adapter protruding from the surface of the structure by the multifunctional arm or by gripping or screwing/removing the heads of the bolts for attaching the shield on the structure in the space to support the robot body, and by moving the gripping positions sequentially while extending/contracting the arm.

In the invention (6), the module can be lifted by the manipulation tool while the multifunctional arm is fixing the body on the structure. In the invention (7), on the other hand, the manipulation tool is equipped with the piston type adapter so that the manipulation tool and the structure, or the module, can be reliably fixed by causing the socket portion on the structure side into engagement. In the invention (5), the module to be replaced can be easily lifted and moved.

In the invention (8), on the other hand, the multifunctional arm is equipped at its manipulation tool with the unbolting driver, which can be manipulated to remove the bolt for attaching the module or for mounting the bolt. By the manipulation tool, therefore, the multifunctional arm removes the bolt of the shield at first, can lift and remove the shield and can hold and move it.

In the invention (9), on the other hand, the structure, e.g., the hand rail attached to the surface of the house module in space, can be gripped by the multifunctional arm of the invention (5) so that the moving range of the multifunctional arm can be widened in addition to the movement by the gripping of the bolt head.

In the invention (13), on the other hand, the working robot comprises a robot body, a plurality of multifunctional arms including a plurality of arms connected to each other and turnably attached at their one end to the lower face of the body and having manipulation tools connected to their other end and drills or bits disposed on the manipulation tools of the multifunctional arms and adapted to be inserted and fixed in the ground. The multifunctional arms are enabled to move the body by extending/contracting themselves with the robot body being unfixed on the ground and by screwing the drills or bits into the ground, then to fix the body on the ground by the drills or bits, and to remove the drills or bits of the multifunctional arms from the ground after the body is fixed. With this construction, the body can be moved over the ground by inserting the drills or bits into the ground of a satellite or the like to alternate the fixing (screwing) and removal (or unscrewing) by the manipulation tools of the multifunctional arms and by extending/contracting the arms. When the robot body is to be fixed over the ground, on the other hand, the body is reliably fixed by fixing the drills or bits of the body in the underlying ground.

In the invention (14), the robot body can be moved easily and speedily over the ground by replacing the drills or bits at the manipulation tools of the multifunctional arms by the wheel adapters in the invention (13).

In the invention (16) or (15), in line with the inventions (15) and (13), the light and the camera are disposed around and in the manipulation tools of the multifunctional arms so that the image from the camera can be fetched into the control chamber or the like. In the invention (5), it is possible to observe the situations around the structure in the space and to acquire the data by the data processing. In the invention (13), on the other hand, it is possible to observe the ground of the satellite.

In the invention (17), on the other hand, the working robot comprises the robot body and a plurality of legs/arms connected at their end portions and turnably attached at their one end to the body and having manipulation tools connected to their other end. The arms move the body by gripping the sockets or bolt heads protruding from the surface of the structure by the manipulation tool and by extending/contracting the arm device to change the grips to other sockets or bolt heads, and the arms are enabled to grip, carry and transfer an object by their manipulation tools. With this construction, the robot body can be reliably moved by supporting the body on the structure by the manipulation tools of the arms, and by moving the gripping positions sequentially while extending/contracting the arms. On the other hand, the M/D shield can be lifted, transported or replaced by using a desired number of arms to manipulate the manipulation tools of the arms. Moreover, the object can be mounted on the upper face of the body by manipulating the necessary arms.

When any arm of the robot is troubled so that the manipulation tool cannot be controlled or removed from the bolts or the like, according to the invention (18), the attaching portion of the troubled arm on the body can be separated and left as it is by itself or by a remote control, so that the body can be moved by the remaining arms to ensure safety.

Since the body is equipped with the visual sensors, according to the invention (19), an obstruction or the like can be detected, if any, and the body can be manipulated, when moved, while recognizing its own position precisely so that the work can be precisely done in space.

Since the adapter is attached to the leading end of the arm, according to the invention (20), when the portion of the adapter for gripping the structure is troubled and cannot be removed from the gripping bolts or the like, the adapter is separated from the arm leading end, so that the body can be moved while leaving the adapter, thereby to ensure safety.

In the invention (21), an object of an arbitrary shape can be mounted, and the support device moves to hold the object or container on two sides even if the object has a variety of different sizes. In the invention (22), the adapter is used so that the support tool for the worker to work outside of the space vehicle can mount the boxes of various shapes such as the tool holding devices to be attached to the manipulation tool or the experimental boxes by using the arms and can fix them by the support devices.

In the inventions (23) and (24), the arm is extensible and can be adjusted in its attaching position on the body. According to the surrounding environments such as the width of the structure or to the size of the moving position, the arm can be extended/contracted, and the attaching interval of the arms on the body can also be adjusted to move and control the working robot in the optimum state.

In the invention (25), the body and the arm are equipped with the solar cells capable of generating electric power at individual portions. In the invention (26), on the other hand, the large-sized antenna can be mounted to provide functions to the communication tracking between the earth and the space station and to move the antenna to an arbitrary position.

In the invention (27), the body can be folded up at a plurality of portions, so that it can be made compact in its entirety. This is effective for transporting the body into of the space station through a narrow passage.

What is claimed is:

1. A working robot comprising:
   a robot body; and
   at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
   wherein said at least one arm device is extensible and contractible, and
   wherein said at least one arm device comprises at least one moving arm and at least one multifunctional arm, and said at least one moving arm is for moving said robot body with said manipulation tool by either gripping a head of a bolt of a plurality of bolts for attaching an attached member to a surface of a structure, or removing the bolt and screwing another bolt in place of the bolt, and by extending and contracting said at least one moving arm.

2. A working robot as set forth in claim 1, wherein a lower face of said robot body has a fixing member, and said robot body and said at least one multifunctional arm are operable to lift the attached member by fixing said fixing member onto the attached member and by fixing said manipulation tool of said at least one multifunctional arm onto another attached member to be replaced.

3. A working robot as set forth in claim 2, wherein said fixing member of said robot body is a piston type adaptor and said multifunctional arm has another piston type adapter, and said manipulation tool and the structure have sockets that are engagable with said adapters.

4. A working robot as set forth in claim 2, wherein said manipulation tool of said at least one multifunctional arm has an unbolting driver for the plurality of bolts of the attached member.

5. A working robot as set forth in claim 2, wherein said manipulation tool of said at least one multifunctional arm has a hand for gripping hand rails attached to the structure.

6. A working robot as set forth in claim 1, wherein said manipulation tool of said at least one moving arm has a light and a camera.

7. A working robot as set forth in claim 1, wherein said at least one multifunctional arm has a light and a camera for detecting a position of said at least one multifunctional arm and a state of the ground.

8. A working robot comprising:
   a robot body; and
   at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
   wherein said at least one arm device is extensible and contractible, and
   wherein said at least one arm device comprises a plurality of multifunctional arms having manipulation tools and said multifunctional arms are operable to move said robot body by said manipulation tools gripping sockets or bolt heads protruding from a surface of a structure and by said multifunctional arms extending and contracting.

9. A working robot as set forth in claim 8, wherein one of said plurality of multifunctional arms is operable to replace an attached member attached to a surface of a structure by fixing said manipulation tool of said one of said plurality of multifunctional arms onto the attached member to be replaced, and by said manipulation tools of a remainder of said plurality of multifunctional arms gripping the sockets or bolt heads of another attached member.

10. A working robot as set forth in claim 9, wherein said manipulation tools of said plurality of multifunctional arms have piston type adapters operable to engage with sockets within the structure.

11. A working robot as set forth in claim 9, wherein said manipulation tools of said plurality of multifunctional arms have unbolting drivers for bolts of the attached member.

12. A working robot as set forth in claim 9, wherein said manipulation tools of said plurality of multifunctional arms have hands for gripping hand rails attached to the structure.

13. A working robot as set forth in claim 8, wherein leading ends of said manipulation tools have lights and cameras.

14. A working robot as set forth in claim 8, wherein said plurality of multifunctional arms have lights and cameras for detecting positions of said plurality of multifunctional arms and a state of the ground.

15. A working robot comprising:
a robot body; and
at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
wherein said at least one arm device is extensible and contractible, and
wherein said at least one arm device comprises at least one moving arm having said manipulation tool and at least one multifunctional arm, a lower face of said robot body and said manipulation tool of said at least one moving arm have drills or bits for inserting and fixing in the ground, and said at least one moving arm is operable to move said robot body, while said robot body is unfixed on the ground, by said at least one moving arm extending and contracting and screwing said drill or bit of said at least one moving arm into the ground, then to fix said robot body on the ground by said drills or bits of said robot body, and to remove said drill or bit of said at least one moving arm from the ground after said robot body is fixed.

16. A working robot as set forth in claim 15, wherein said manipulation tool of said at least one moving arm has a light and a camera.

17. A working robot as set forth in claim 15, wherein said at least one multifunctional arm has a light and a camera for detecting a position of said at least one multifunctional arm and a state of the ground.

18. A working robot as set forth in claim 20, wherein said plurality of multifunctional arms have lights and cameras for detecting positions of said plurality of multifunctional arms and a state of the ground.

19. A working robot comprising:
a robot body; and
at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
wherein said at least one arm device is extensible and contractible, and
wherein said at least one arm device comprises at least one moving arm having said manipulation tool and at least one multifunctional arm, and said manipulation tool of said at least one moving arm has a wheel adapter operable to move said robot body.

20. A working robot comprising:
a robot body; and
at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
wherein said at least one arm device is extensible and contractible, and
wherein said at least one arm device comprises a plurality of multifunctional arms having manipulation tools, said manipulation tools of said plurality of multifunctional arms having drills or bits for inserting and fixing in the ground, and said plurality of multifunctional arms are operable to move said robot body by alternately extending and contracting and alternately screwing and removing said drills or bits into or from the ground.

21. A working robot as set forth in claim 20, wherein leading ends of said manipulation tools have lights and cameras.

22. A working robot comprising:
a robot body; and
at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
wherein said at least one arm device is extensible and contractible, and
wherein said at least one arm device comprises a plurality of multifunctional arms having manipulation tools, said manipulation tools of said plurality of multifunctional arms having wheel adapters operable to move said robot body.

23. A working robot comprising:
a robot body; and
at least one arm device including a plurality of arm members and a manipulation tool, wherein adjacent end portions of said plurality of arm members are articulately jointed, one end of said at least one arm device is turnably attached to said robot body, and said manipulation tool is located at another end of said at least one arm device,
wherein said at least one arm device is extensible and contractible, and
wherein said at least one arm device is operable to move said robot body by said manipulation tool gripping sockets of bolt heads protruding from a surface of a structure and by at least one arm device extending and contracting, and said manipulation tool of said at least one arm device is for gripping, carrying and transferring an attached member attached to a surface of a structure.

24. A working robot as set forth in claim 23, wherein said at least one arm device has an attaching portion attaching said at least one arm device to said robot body, said attaching portion being operable to detach said at least one arm device from said robot body during operation of said working robot.

25. A working robot as set forth in claim 23, further comprising a plurality of visual sensors are attached to a surface of said robot body.

26. A working robot as set forth in claim 23, further comprising an adapter attached to a leading end of said at least one arm device for gripping the sockets or bolt heads protruding from the surface of the structure, wherein said adapter is removable from said leading end of said at least one arm device during operation of said working robot.

27. A working robot as set forth in claim 23, further comprising a support device disposed on an upper face of said robot body, said support device being adjustable according to a width-wise contour of a supported member of an arbitrary shape to support the supported member on two sides.

28. A working robot as set forth in claim 23, further comprising an adapter operable to mount a supported member of an arbitrary shape on an upper face of said robot body, wherein a bottom surface of the supported member is supported by said adapter.

29. A working robot as set forth in claim 23, wherein said at least one arm device has a plurality of joints and an attaching portion operable to be extended by a predetermined length to adjust a position thereof, and said at least one arm device is operable to extend and contract at said joints.

30. A working robot as set forth in claim 23, wherein said at least one arm device has an extensible mechanism between joints of said at least one arm device, said extensible mechanism being operable to change a moving range, a gripping range and a moving speed of said at least one arm device.

31. A working robot as set forth in claim 23, further comprising a plurality of solar cell modules attached to a surface of said robot body and to a periphery of said at least one arm device so that individual portions of said working robot, even when separated from said robot body, can be driven by communications thereto.

32. A working robot as set forth in claim 23, wherein an upper face of said robot body has an antenna mounted thereon.

33. A working robot as set forth in claim 23, wherein said robot body is foldable in two at a center thereof.

* * * * *